US012638900B2

(12) United States Patent
Gamage et al.

(10) Patent No.: US 12,638,900 B2
(45) Date of Patent: May 26, 2026

(54) SIGNALLING POWER LEVEL THRESHOLD EVENT TO PROCESSING CIRCUITRY

(71) Applicant: Arm Limited, Cambridge (GB)

(72) Inventors: Sahan Sajeewa Hiniduma Udugama Gamage, Cambridge (GB); Parameshwarappa Anand Kumar Savanth, Cambridge (GB); Fernando Garcia Redondo, Cambridge (GB); Jonas Švedas, Cambridge (GB)

(73) Assignee: Arm Limited, Cambridge (GB)

( * ) Notice: Subject to any disclaimer, the term of this patent is extended or adjusted under 35 U.S.C. 154(b) by 383 days.

(21) Appl. No.: 18/309,364

(22) Filed: Apr. 28, 2023

(65) Prior Publication Data

US 2023/0359260 A1     Nov. 9, 2023

(30) Foreign Application Priority Data

May 5, 2022     (GB) ..................................... 2206547

(51) Int. Cl.
*G06F 1/3228* (2019.01)
*G06F 1/3296* (2019.01)

(52) U.S. Cl.
CPC .......... *G06F 1/3228* (2013.01); *G06F 1/3296* (2013.01); *G06F 2201/81* (2013.01)

(58) Field of Classification Search
None
See application file for complete search history.

(56) References Cited

U.S. PATENT DOCUMENTS

| | | | | |
|---|---|---|---|---|
| 5,751,532 A * | 5/1998 | Kanuchok | ............ | H02H 3/0935 |
| | | | | 361/87 |
| 10,790,030 B1 * | 9/2020 | Huang | ................... | G11C 16/32 |
| 2001/0022583 A1 * | 9/2001 | Jiang | ..................... | G09G 1/165 |
| | | | | 345/211 |
| 2009/0206818 A1 * | 8/2009 | Horan | ................... | H02M 5/257 |
| | | | | 323/311 |
| 2013/0268747 A1 * | 10/2013 | Chang | ................... | G06F 9/4405 |
| | | | | 713/2 |
| 2016/0378169 A1 * | 12/2016 | Naeimi | ................... | G06F 1/263 |
| | | | | 713/323 |
| 2019/0187196 A1 * | 6/2019 | Laslo | ................... | H03K 17/955 |
| 2020/0217862 A1 * | 7/2020 | Newberg | ......... | G01N 35/00029 |
| 2020/0233474 A1 * | 7/2020 | Alcorn | ..................... | G06F 1/28 |
| 2022/0214817 A1 * | 7/2022 | Ha | ..................... | G06F 11/1441 |

* cited by examiner

*Primary Examiner* — Paul Yen
(74) *Attorney, Agent, or Firm* — NIXON & VANDERHYE P.C.

(57) ABSTRACT

A method for an intermittent computing apparatus includes performing processing operations with processing circuitry, starting a timer counter in response to a first power level threshold event occurring when a power level for powering the processing circuitry reaches a first threshold value, and signalling the first power level threshold event to the processing circuitry in response to the timer counter reaching a target value.

17 Claims, 13 Drawing Sheets

SIGNALLING POWER LEVEL THRESHOLD EVENT TO PROCESSING CIRCUITRY

CROSS-REFERENCE TO RELATED APPLICATIONS

This application claims priority pursuant to 35 U.S.C. 119(a) to British Application No. 2206547.8, filed on May 5, 2022, which application is incorporated herein by reference in its entirety.

BACKGROUND

Intermittent computing systems are systems that perform computational tasks with periodic (although not necessarily regular) loss of power. For example, the intermittent computing system may be powered using energy generated by an energy harvester which harvests energy from the environment. When the environmental energy source decreases, the power supplied to the intermittent computing system may decrease and cause a loss of power.

SUMMARY

To cope with a loss of power, intermittent computing systems may employ hardware or software schemes to safely shut-down and restore operation from where it left off. Viewed from one aspect, the present technique provides a method for an intermittent computing apparatus comprising: performing processing operations with processing circuitry; starting a timer counter in response to a first power level threshold event occurring when a power level for powering the processing circuitry reaches a first threshold value; and signalling the first power level threshold event to the processing circuitry in response to the timer counter reaching a target value.

Viewed from another aspect, the present technique provides an intermittent computing apparatus comprising: processing circuitry; and counter circuitry configured to start a timer counter in response to a first power level threshold event occurring when a power level for powering the processing circuitry reaches a first threshold value; wherein the counter circuitry is configured to signal the first power level threshold event to the processing circuitry in response to the timer counter reaching a target value.

BRIEF DESCRIPTION

Further aspects, features and advantages of the present technique will be apparent from the following description of examples, which is to be read in conjunction with the accompanying drawings, in which.

DETAILED DESCRIPTION

Figure 1:
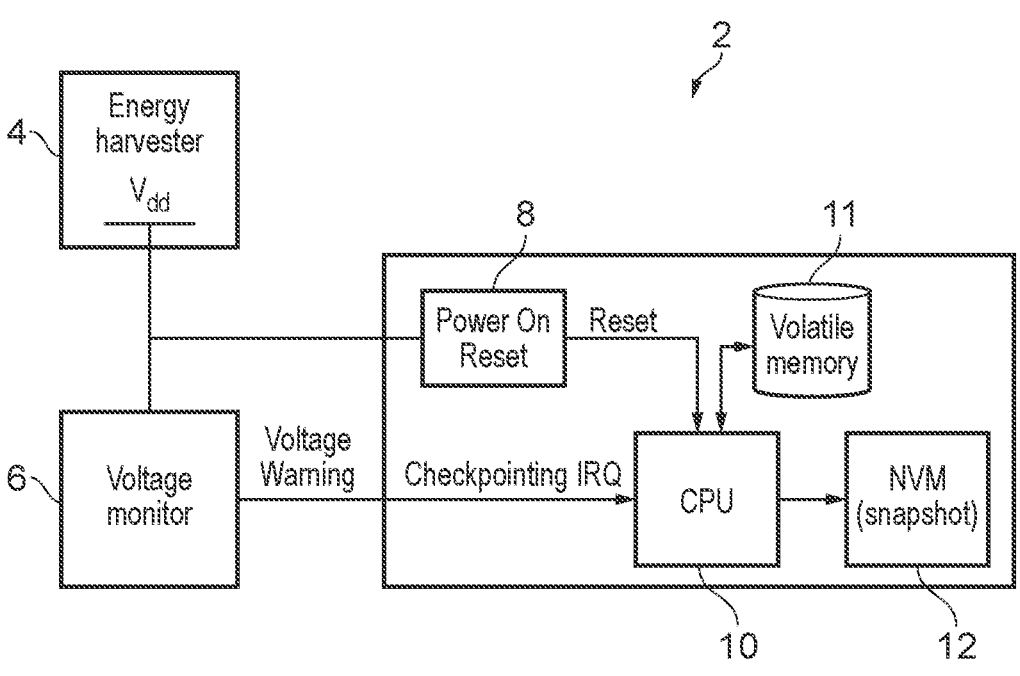
FIG. 1 illustrates an example intermittent computing system.

As introduced above, in an intermittent computing apparatus (intermittent processing device), the power supplied to processing circuitry may vary. Within the intermittent computing apparatus, certain actions may preferably be taken when a power level for powering the processing circuitry reaches a particular level. For example, performing a check-point process, transitioning the compute state from one state to another, and causing processing to resume or restart are all examples of actions which may be taken when a power level reaches a particular threshold value. However, the particular level at which it is best to trigger a given action can vary depending on several factors. For example, the current workload being performed by processing circuitry, information indicative of current power supply conditions (e.g. energy harvesting conditions in an implementation powered based on energy harvesting), and/or variations in device manufacturing may all affect the preferred power level at which a particular action should be taken. Hence, it would be desirable to control the point at which actions are triggered in an intermittent computing apparatus wherein those actions depend on a power level threshold.

One way to control the point at which actions are triggered in an intermittent computing apparatus, wherein those actions depend on the power level, is to vary the power level threshold compared with the power level to decide whether to trigger the actions. However, accurately tracking the power level and comparing it with a variable threshold can be expensive (in terms of circuit area and power usage) and so can be undesirable for an intermittently powered device. Also, the complexity of circuitry for varying a power level threshold may make it practical to support only a limited number of power level thresholds, such that control of a power level threshold may be undesirably coarse-grained.

In order to address these problems, the present technique provides a method for an intermittent computing apparatus comprising: performing processing operations with processing circuitry; starting a timer counter in response to a first power level threshold event occurring when a power level for powering the processing circuitry reaches a first threshold value; and signalling the first power level threshold event to the processing circuitry in response to the timer counter reaching a target value.

The processing circuitry is not particularly limited and may include a central processing unit (CPU), a graphics processing unit (GPU), or a neural processing unit (NPU), for example. Likewise, the processing operations being performed by the processing circuitry are not particularly limited and may be any processing operations that the processing circuitry is capable of performing.

The timer counter may be any counter which advances as time advances. For example, the timer counter may store a counter value that is started at a start value and is advanced by incrementing or decrementing the counter value. The timer may be advanced in response to a timer clock signal, for example.

Whether the power level for powering the processing circuitry has reached the first threshold value may be detected based on any value indicative of the power level for powering the processing circuitry. For example, the value indicative of the power level may be a voltage of a power supply powering the processing circuitry. The value indicative of the power level may instead be the value of a current of a power supply for powering the processing circuitry. In other examples, the value indicative of the power level may not be directly measured from the signal for powering the apparatus but may be indirectly measured. For example, the value indicative of the power level may characterise an environmental energy source. If the intermittent computing apparatus is powered by energy harvested using a solar cell, then the value indicative of the power level may be a parameter characterising the amount of light available to the solar cell (such as a light intensity value). In addition, there may be several different power levels within an apparatus (for example if the processing circuitry has different voltage domains), and the value indicative of the power level may relate to any one of the power levels of the apparatus.

The first threshold value is not particularly limited. For example, the first threshold value may be a low-power threshold indicating that the power level is at a point where checkpointing may be performed. Alternatively, the first threshold value may be a sufficient-power threshold indicating that the power level is at a point where previously suspended processing may restart or new processing may begin, for example.

The first power level threshold event may be signalled to the processing circuitry in a variety of ways. For example, the signal may be an interrupt issued to the processing circuitry by a dedicated physical wired channel, or using a message-signalled interrupt based mechanism. The signal may be the same signal which caused the timer counter to be started (in which the timer counter acts to delay transmission of the signal) or could be a new signal generated by the circuitry providing the timer counter.

By signalling the first threshold power level event to the processing circuitry in response to the timer counter reaching a target value, the present technique introduces a delay between the first power level threshold event and the signalling of the first power level threshold event. This delay allows responses to the first power level threshold event to be delayed. Accurately adjusting a delay introduced by a timer counter is associated with lower circuit area and power costs than adjusting the first power level threshold itself (in some examples the power level threshold may be coarsely adjusted). Therefore, signalling a first power level threshold event via a timer counter and tuning a delay using the timer counter provides a more efficient method for tuning the timing of actions triggered by the first power level threshold event than adjusting the first power level threshold alone.

As discussed, a first variant of the first power level threshold event may comprise a low-power threshold event which occurs when the power level falls below a low-power threshold value. The low-power threshold value may be a value below which it is more likely that a brownout event will occur soon. The low-power threshold value may, for example, be set to a power level at which even if the power supply drops sharply, there is likely to be sufficient power to complete a shutdown routine.

In some examples, in response to the low-power threshold event being signalled to the processing circuitry, the processing circuitry may switch to a different (such as a lower-power) compute state.

In some examples, the method comprises performing a checkpoint process comprising storing a checkpoint of context data corresponding to processing performed by the processing circuitry to a non-volatile data store in response to the low-power threshold event being signalled to the processing circuitry. Using the timer counter to introduce a delay between the low-power threshold event and starting the checkpoint process means that the checkpoint process may be delayed. Hence, a greater number of processing operations can be completed before the checkpoint process starts compared to the case where the checkpoint process begins at the low-power threshold event. The low-power threshold may be set conservatively, and the delay introduced by the timer counter may be used to tune the time at which the checkpoint process begins so that the available processing time can be utilised more fully. As the time to complete the checkpoint process may vary, the start time of the checkpoint process can be tuned using the timer counter and a performance gain can be achieved.

A target period comprises a time taken for the timer counter to advance from a start value to the target value. By adjusting the start value, the target value, a step size of the timer counter, a step frequency of the timer counter, and so on, the target period of the timer counter can be updated. Hence, any of the start value, target value, step size, and step frequency may be a value indicative of the target period.

In some examples, the value indicative of the target period may not be updated following restoration of power after a power-loss event.

However, in some examples, the value indicative of the target period of the timer counter may be updated following restoration of power after a power-loss event occurs when the power level falls below a minimum value. The value indicative of the target period may be updated based on the outcome of the checkpoint process started prior to the power-loss event.

A checkpoint process may fail to complete when the power level falls below a minimum power level (a power-loss event) during the checkpoint process. When a checkpoint process fails to complete, this indicates that the checkpoint process was started too late. If the checkpoint process is started in response to the low-power threshold event being signalled to the processing circuitry, then failing to complete the checkpoint process indicates that the low-power threshold event was signalled too late. This suggests that the target period is too long. It is desirable to avoid the checkpoint process failing, as this means that the results of processing performed prior to the checkpoint process that has not been previously checkpointed may be lost. Therefore, to reduce a risk of a future checkpoint process failing to complete, the target period may be reduced in response to determining that the checkpoint process failed to complete due to the power-loss event.

After a checkpoint process successfully completes, the processing circuitry may be placed in a sleep state until processing is resumed. The processing circuitry is placed in the sleep state in anticipation of a power-loss event occurring. However, if there is a long period between the checkpoint completing and the power-loss event, then useful processing time may not have been fully utilised. Hence, in some examples, the method comprises, following the completion of the checkpoint process and prior to the power-loss event, storing to a non-volatile data store an indication of time elapsed since the completion of the checkpoint process and updating the value indicative of the target period in dependence on the stored indication. As the indication of the time elapsed is stored to a non-volatile data store, it will be retained in the event of a power loss and can be accessed by the apparatus once power is restored. If the time elapsed since the completion of the checkpoint process prior to the power-loss event is longer than desired (indicating a large amount of under-utilised processing time) then the value indicative of the target period may be updated to increase the length of the target period and cause the checkpoint process to begin later. On the other hand, if the time elapsed since the completion of the checkpoint process prior to the power-loss event is shorter than desired (indicating an increased risk of failing to complete the checkpoint) then the value indicative of the target period may be updated to decrease the length of the target period and cause the checkpoint process to begin earlier. The indication of the time elapsed may be stored to the non-volatile data store at regular or irregular intervals. Alternatively, in some examples, the indication of the time elapsed may be stored to the non-volatile data store only once, in response to a further power level threshold event when the power level reaches a further threshold below the low-power threshold. The indication of the time elapsed may be written to a single storage location within the non-volatile data store, overwriting the previously stored value, or may be written to a different location each time.

The time elapsed since the completion of the checkpoint process may be determined using one of several techniques. For example, a dedicated timer counter may be provided to record the time elapsed since the completion of the checkpoint process. However, in some examples the time elapsed since the completion of the checkpoint process is determined using the same timer counter used to delay the signalling of the first power level threshold event. For example, the timer counter may continue running after it has reached the target value and the value of the timer counter may be stored to the non-volatile data store. Alternatively, the timer counter may be restarted once the checkpoint process completes and the value stored to the non-volatile data store. Reusing the timer counter is a particularly efficient technique for recording the time elapsed since the completion of the checkpoint process as it reduces the area cost of providing a separate counter or circuitry.

As discussed above, a second variant of the first power level threshold event may comprise a sufficient-power threshold event which occurs when the power level exceeds a sufficient-power threshold value. The sufficient-power threshold value may be the level of power required to resume processing following the start of a checkpoint process but prior to a power-loss event, the level of power required to restart processing after a power-loss event (which may be higher due to the power needed to restore execution state from NVM), or the level of power required to start processing from fresh when the apparatus is powered on for the first time, for example.

In some examples, the method comprises starting or resuming processing in response to the sufficient-power threshold event being signalled to the processing circuitry. The sufficient-power threshold event therefore indicates that the power level is high enough for processing to begin. However, when processing begins, the power consumed by the processing circuitry increases. This increase in power consumption may cause the rising power level to decrease again, and may cause processing to be suspended soon after processing begins (for example, if the power level falls below the low-power threshold). In this case, there may be insufficient time to complete processing operations between the sufficient-power threshold event and the suspension of processing. For example, there may be insufficient time to complete processing operations and perform a checkpoint process, so that any processing progress is lost. Delaying signalling the sufficient-power threshold event to the processing circuitry allows more time for the power level to continue rising above the sufficient-voltage threshold, such that when processing does resume there may be more time available to complete processing operations before processing is suspended, and in particular may be enough time to checkpoint any progress. Hence, using the timer counter to delay signalling of the first power level threshold event increases the amount of processing operations that can be completed as it allows a delay from the sufficient-power event for the power level to continue to rise. One might think that a similar result could be achieved by raising the sufficient-power threshold, however by raising the sufficient-power threshold, processing may not start in cases where the power level sits below the raised sufficient-power threshold but wherein the energy harvesting is sufficient to support the power load of the processing circuitry. Having a lower sufficient-power threshold and a timer counter overcomes this problem, and also allows for lower-overhead adjustment of the delay introduced because the period counted by the timer counter can be adjusted with lower overhead than adjustment to a power threshold.

In some systems, the timer counter is used to delay signalling of the first power level threshold event only when the first power level threshold event is the first variant (and not the second variant—the power level passing the second variant of the threshold may be signalled based on the power level comparison without delay based on the timer counter). In other systems, the timer counter may be used to delay signalling of the first power level threshold event only when the first power level threshold event is the second variant (and not the first variant—in that case the power level passing the first variant of the threshold may be signalled based on the power level comparison without delay based on the timer counter). In some systems, however, signalling of the first power level threshold event is delayed using a timer counter for both the first and second variants of the first power level threshold event. In these systems, in one example the two variants of the first power level threshold event may cause separate timer counters to be started, however in another example the same timer counter may be started in response to both the first and second variants.

The features discussed below may be applied whether the first power level threshold event is the first variant, the second variant, or in some examples another variant not previously discussed.

In some examples, the value indicative of the target period may be set independently of workload. For example, a given timer counter may be associated with a predetermined target period (that may be adjusted following restoration of power after a power-loss event). However, the time required to complete a checkpoint depends on the processing being performed by the processing circuitry as different workloads require different amounts of execution state to be stored to NVM. Hence, it may be desirable for the delay introduced by the timer counter (which determines how much time is available for checkpointing) to depend on the workload. The power consumption of the processing circuitry also depends on the workload. The power consumption determines how much time should be introduced following a sufficient-power threshold event to allow processing to be performed. Hence, it may be desirable for the delay introduced by the timer counter (which may determine how much time is available for processing following a sufficient-power event) to depend on the workload. Therefore, in some examples the value indicative of the target period for the timer counter is set dependent on the workload being performed by the processing circuitry. In some examples, the target period is programmable by software running on the processing circuitry. The software running on the processing circuitry may set the timer counter based on the current program being executed and/or the progress through the program. For example, a given program may include stages whereby data is acquired, processed, and characterised by a value. After the acquiring stage there may be lots of execution state (each of the acquired values) but this may be decreased once the acquired data has been processed, hence the execution state may depend on the progress through a program.

The power level in an intermittent processing apparatus may rise and fall in any way. For example, if the power level falls below the low-power threshold value then it may increase again above the low-power threshold before the timer counter has reached the target value. In this case, there may be no need to signal the low-power threshold event (for example, the checkpoint process may be unnecessary). Sometimes, the power level may reach the first power level threshold value but then change direction before the timer counter reaches the target value. The timer counter is started when the first power level threshold event occurs, but if the power level begins changing in the opposite direction, it may be unnecessary for the timer counter to signal the first power threshold event to the processing circuitry. Hence, in some examples there may be a second threshold value, and when the power level reaches the second threshold value then the timer counter may be reset. The second threshold value may be the same as the first threshold value or may take a different value (for example, if the first threshold value is a low-power threshold value the second threshold value may be slightly higher to favour checkpointing over not checkpointing). By resetting the timer counter when the power level reaches a second threshold, then unnecessary responses to temporary changes in power level can be suppressed. For example, if the power level very briefly drops below the low-power threshold then recovers, an expensive checkpoint process can be avoided by starting and then resetting the timer counter. Although discussed with reference to the low-power threshold, the second threshold may be defined based on any first threshold value (e.g. a sufficient-power threshold). Instead of resetting the timer counter, in some examples the timer counter may be reversed when the power level reaches the second threshold. For example, if the timer counter counts down from a start value to a target value then when the power level reaches the second threshold value, the timer counter may start counting up again (for example, until it reaches the start value). With reference to the low-power threshold, if the power level is below the low-power threshold and the timer counter is advancing towards the target value but the power level has a very temporary spike above the second threshold, reversing the counter while the power level is above the low-power threshold (and restarting it once below again) means that the timer counter has a way of determining that it has recently been below the low-power threshold and will signal the low-power event more quickly than if the timer counter were simply reset when the power level spiked above the second threshold. Hence, reversing the counting direction of the timer counter in response to a second power level threshold event introduces some record of the recent history into the timer counter to account for temporary spikes/dips in power level.

In some examples, the processing circuitry may comprise several processors. For example, the several processors may include separate cores of a central processing unit (CPU), a graphics processing unit (GPU), a neural processing unit (NPU), and so on. The processors may have target values specified independently of each other. Therefore, if one processor is running a workload that requires more time for checkpointing (for example), it may specify a target value that results in a shorter target period than a processor running a different workload requiring less time for checkpointing. In some examples, each processor may be associated with a separate timer counter, with the timer counters started in response to a shared determination of a single first power level threshold event. Providing separate timer counters may allow target periods to be controlled separately for each processor, but starting the timer counters in response to a single threshold event allows the timer counters to share the same circuitry for determining whether the first power level threshold event has occurred. Without the timer counters, each processor may want to be associated with a different first power level threshold and therefore provide its own power level comparison circuitry and hence providing timer counters may allow a reduction in circuitry overhead in multi-processor systems by reducing the amount of power level comparison circuitry. In other examples, rather than providing each processor with its own timer counter, the processors may share one timer counter. The timer counter may start at a particular start value (for example 0) and advance (for example, by counting upwards) constantly. When the timer counter reaches the target value for each processor, a first power level threshold event may be signalled to that particular processor. Sharing a timer counter between processors may result in a reduced overhead as the power and circuit area cost of both the power level comparison circuitry and the timer counter can be shared among processors.

The timer counter may be advanced by updating the count value in steps of a given size (for example, start at 0 and increase by 1 each clock cycle). In some examples, the step size may be fixed. However, (using the low-power example for illustration only, similar considerations apply to the sufficient-power and other examples) the time available between the first low-power threshold event and power-loss varies depending on the rate of change of the power level. Hence, even for processors having the same workload (in which checkpointing takes the same amount of time) the time at which the low-power event should be signalled to the processing circuitry (to allow the checkpoint process to complete and increase time available for processing before starting the checkpoint process) may vary based on the rate of change of the power level. Hence, in some examples it may be desirable to adjust the timer counter based on the rate of change of the power level. In some examples, this may be achieved by adjusting the target value based on a parameter indicative of a rate of change of the power level. In some examples, this may instead be achieved by adjusting the step size of the timer counter based on a parameter indicative of a rate of change of the power level. For example, if the power level is decreasing with a higher rate of change then there may be less time in which to complete the checkpoint, so the checkpoint should be started sooner. By increasing the step size of the timer counter in this case, the target value will be reached sooner and the checkpointing will start sooner. Likewise, in response to a shallow rate of change the step size may be decreased. The parameter indicative of the rate of change of the power level may be based on a direct measurement of the power level (e.g. a gradient calculated based on two or more readings of the power level over time) or may be based on a secondary value such as an environmental measurement indicating a rate of energy harvesting.

In some examples, the timer counter may be advanced using the same clock signal as the processing circuitry. However, the processor clock may require a large amount of power and circuit area (e.g. circuitry for stabilising the clock signal) as it has stringent timing requirements that may be more stringent than the timer counter requires. After a low-power event or before a sufficient-power event, the power available to the intermittent processing apparatus may be limited. Hence, it may be desirable to use a lower power clock signal to update the timer counter. Therefore, in some examples the counter clock signal is different to a processor clock signal used to clock the processing circuitry. In some examples, the counter clock signal and the processor clock signal may originate from the same clock, but the processor clock signal may undergo more (power consuming) filtering or stabilisation operations than the counter clock signal.

In some examples, the detection of whether the power level reaches the first threshold value is performed using analogue comparison circuitry. For example, the analogue comparison circuitry may compare the measured power level to the first voltage threshold value and issue a signal when the measured value reaches the first threshold. In some examples, a delay between the occurrence of the first power level threshold event and the signalling of the first power level threshold event by the counter circuitry is tuneable using digital circuitry setting a target period comprising a difference between a start value of the timer counter and the target value. Hence, although the detection of the first power level threshold event is performed by analogue circuitry, the delay before this is signalled to the processing circuitry is tunable by digital circuitry. Also, the timer counter circuitry may be digital circuitry. Performing the fine tuning of the delay using a digital timer counter rather than adjusting the analogue power level comparison circuitry may lead to lower overhead, as it requires less power and circuit area to adjust a digital counter than to accurately adjust an analogue threshold. Also, given the circuit complexity of tuning an analogue comparison, it is likely to be practical to support only a limited number of threshold options using the analogue comparison of the power level, but the digital tuning of the timer counter period can offer more fine-grained control of the timing of signalling the first power level threshold event.

In some examples, the intermittent processing apparatus is powered using any given power source (even a reliable consistent power source) and the power supply is intermittent because other apparatuses powered by the same power source may use the power supply with a greater priority. Hence, the amount of the power source that is available to the intermittent processing apparatus may vary based on the amount of the power source that is used by the other apparatuses. However, in other examples the intermittent computing apparatus is powered using harvested energy, and the power supply is intermittent due to variations in the amount of energy that can be harvested.

The present technique will now be described further with reference to the accompanying figures.

In intermittent computing systems (intermittent processing devices), the power supplied to processing circuitry may vary, and may occasionally drop below a minimum operating power for the processing circuitry. The period during which the power level is below a minimum operating power is sometimes referred to a brownout, and during a brownout the power level may be too low for processing operations to be performed by the intermittent processing device.

Intermittent processing devices store data such as execution state associated with data processing operations in volatile data storage. When power loss occurs, data (such as execution state) stored in volatile memory risks being lost, since volatile memory may guarantee retention of data only when at least a certain minimum level of power is available to maintain the stored data.

One solution to this problem is to store the execution state in non-volatile memory, which does not require a power supply to maintain data (and hence can safely store data even if a brownout occurs, for example). However, non-volatile memory can be very expensive (e.g. in terms of latency and power consumption) to access. Hence, for rapidly changing data such as execution state, the cost of repeatedly accessing non-volatile memory to read and write execution state may be considered unacceptably high.

A compromise, which provides the advantages of using volatile memory to store execution state, while still providing some protection against data loss in the event of a brownout, is to perform a checkpointing process. A checkpointing process involves storing, to non-volatile memory (NVM), a snapshot of the current execution state (e.g. this could be a copy of some or all of the execution state currently stored in volatile memory). If a power loss occurs at some point, then once power is restored, data processing can resume from the point at which the checkpointing process was performed by restoring the saved execution state from the NVM.

A checkpointing process could be performed periodically. However, it takes time and power to store a checkpoint to NVM, and in many cases it could be an unnecessary waste of resources to perform a checkpoint (for example, if the power level is very high and there is no risk of a brownout). Therefore, in some intermittent processing systems, a checkpoint could instead be performed based on a live measurement of the power level supplying the processing circuitry. In some intermittent processing devices, a power loss prediction may trigger an interrupt that will cause the processing circuitry to perform checkpointing when a measurement of the power level reaches a certain threshold value. Then, the checkpointing process will take place and the processing circuitry can enter a sleep state until brownout occurs. However, the time required to complete the checkpointing process is highly variable. Because the checkpointing process involves saving execution state to NVM, the time taken will depend on the volume of execution state that is to be stored to NVM. The volume of execution state to be stored to NVM varies greatly based on the workload being performed by the processing circuitry (e.g. which programs are being executed by the processing circuitry and how far the processing circuitry is through a given program) and hence the time required to complete the checkpointing process can vary greatly. For some apparatuses, the threshold value at which checkpointing is performed may be set so that even in the worst case, there is sufficient time to complete checkpointing before power loss occurs. However, this means that in many cases the checkpointing finishes well before power loss, and hence there is unused time between the checkpointing process finishing and the power loss event where the power level of the apparatus is high enough to perform processing operations but no processing is being performed.

In some intermittent processing devices, the processing circuitry may resume processing operations when the power level increases and reaches a sufficient-power threshold. However, processing operations consume power and, while the power supplied to the intermittent processing device may be sufficient to increase the power level whilst the processing circuitry is not active, when the processing circuitry resumes processing operations the power level may begin to drop again. If the processing resumes at a particular threshold, then the subsequent drop in power may quickly cause processing to be stopped and cause another checkpoint process to begin. However, if the processing had started later then the power level may have had a chance to rise to a higher level and allow a larger amount of processing to be completed prior to processing being stopped.

Hence, some intermittent processing apparatuses suffer from the problems that processing time is not utilised due to certain checkpoint processes taking place too early and certain processing starting or resuming too early after a power loss event.

Some solutions to these problems may involve dynamically adjusting the voltage thresholds at which certain processes occur. However, accurately generating a variable voltage threshold can be expensive (in terms of circuit area and power usage) and be undesirable for an intermittently powered device.

FIG. 1 illustrates an example intermittent computing system 2. The intermittent computing system 2 comprises an energy harvester 4, a voltage monitor 6, Power On Reset (POR) circuitry 8, a CPU (central processing unit) 10, volatile memory 11, and non-volatile memory (NVM) 12. The CPU is an example of processing circuitry. It will be appreciated that other types of processing circuitry could also be provided, e.g. a graphics processing unit (GPU) or neural processing unit (NPU—a type of processor with hardware designed to support machine learning processing such as neural networks). The NVM 12 could use any of a variety of memory storage technologies, e.g. flash memory, ferroelectric RAM, magnetoresistive RAM, phase change memory, etc. Hence, the NVM 12 can be any form of non-volatile storage technology that allows data to be retained even if the voltage falls below the minimum voltage required to guarantee retention of data in the volatile storage 11.

The energy harvester 4 harvests energy from the environment, and outputs an electrical signal having a voltage $V_{dd}$. The energy harvester may have some internal energy storage such as a capacitor between the directly harvested energy and the output voltage $V_{dd}$. The voltage monitor 6 receives the signal from the energy harvester and monitors the voltage $V_{dd}$. When the voltage $V_{dd}$ reaches a warning threshold the voltage monitor 6 issues a voltage warning signal (e.g. a Checkpointing interrupt (IRQ)) to the CPU 10. The checkpointing interrupt could be delivered to the CPU 10 either by a dedicated physical wired channel (e.g. an interrupt distribution network), or using a message-signalled interrupt based mechanism where the voltage monitor 6 requests that a memory location is updated, with the CPU 10 monitoring that location to detect the interrupt being signalled. The voltage warning signal indicates that the power harvested by the energy harvester has reached the warning threshold value, and that if the CPU is performing processing operations, then the CPU 10 should save a checkpoint of its state of execution to the NVM 12 in case the harvested power drops below a minimum power level, below which the CPU 10 is unable to perform processing operations and execution state stored in volatile memory 11 may be lost. Therefore, in response to the voltage warning signal, the CPU 10 stores a checkpoint of its state of execution to the NVM 12. The POR circuitry 8 also receives the signal from the energy harvester and monitors the voltage $V_{dd}$. When the $V_{dd}$ reaches a POR threshold, the POR circuitry 8 issues a reset signal to the CPU 10. The reset signal indicates that the voltage has reached a POR threshold, at which there may be sufficient power to restore checkpoint state and continue processing. The CPU 10 restarts processing in response to the reset signal.

Figure 2:
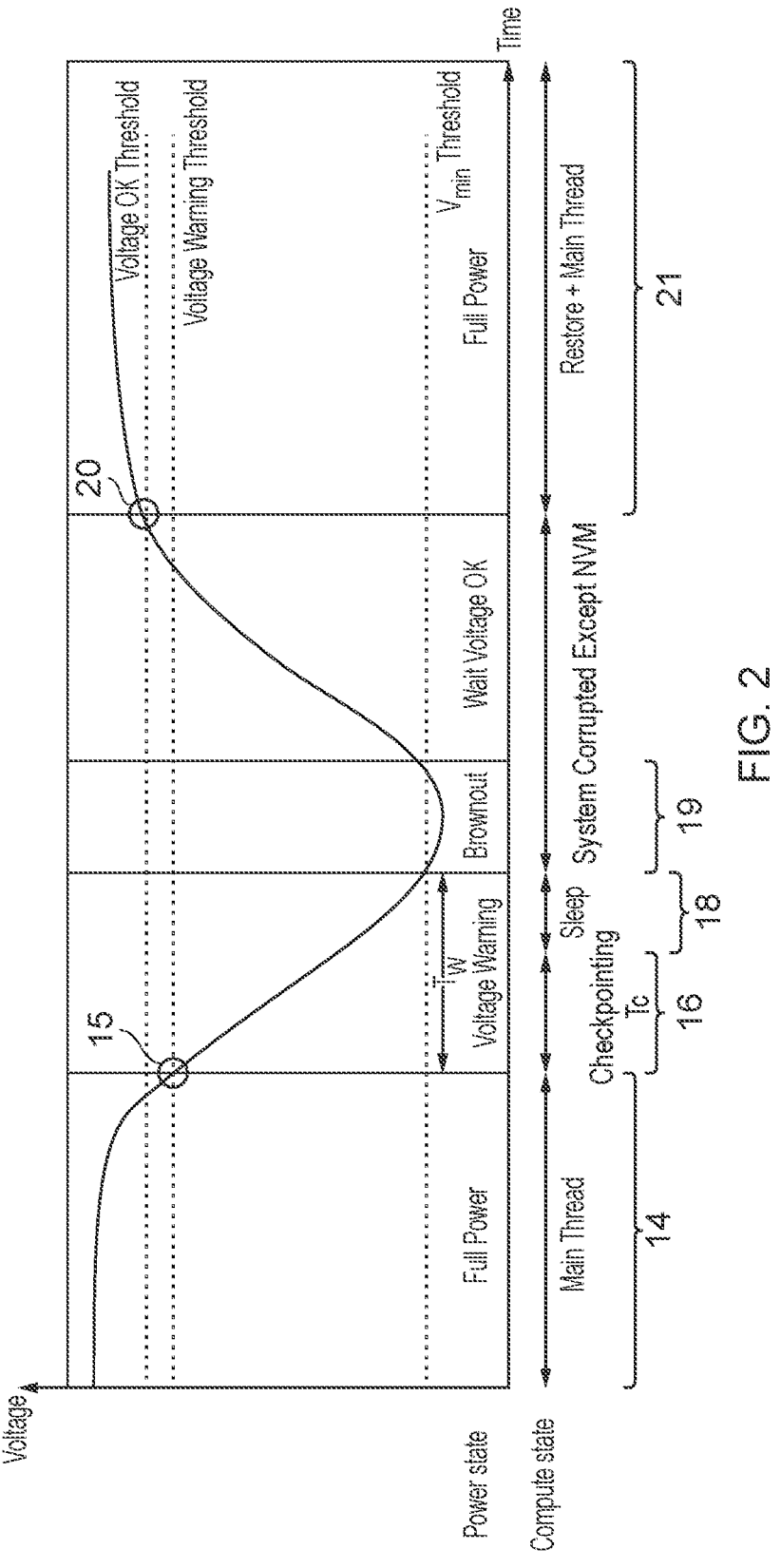
FIG. 2 illustrates an example power cycle sequence for an intermittent computing system employing dynamic check-pointing.

FIG. 2 illustrates an example power cycle sequence for an intermittent computing system employing dynamic checkpointing. At stage 14, the voltage of the energy harvester output is above the voltage warning threshold. Therefore, at stage 14 the CPU 10 is performing processing operations normally and the processor is therefore in the main thread compute state. At stage 15 the voltage has fallen to the voltage warning threshold value. Hence, at stage 15 the voltage monitor 6 issues a voltage warning signal to the CPU 10. Following receiving of the voltage warning signal, at stage 16 the CPU 10 interrupts the main thread of processing being performed at 14, and switches to performing a checkpoint process which saves execution state (e.g. register state and context data in memory) to the NVM 12. Once the CPU 10 has completed the checkpoint process, at stage 18 the CPU goes into a sleep state in which processing operations are not performed. At stage 19, the harvested voltage drops below a minimum voltage ($V_{min}$) below which the CPU 10 is unable to perform processing operations and volatile memory 11 associated with the CPU 10 may lose any stored information. However, the NVM 12 does not require power to store information and therefore any information stored in the NVM will be retained when the voltage falls below $V_{min}$. At stage 20, the voltage has increased and reaches the reset voltage (sufficient-power threshold). Therefore, at stage 20 the power on reset circuitry 8 issues a reset signal to the CPU 10. After receiving the reset signal, at stage 21 the CPU 10 restores, from the NVM 12, the execution state that was stored at stage 16. By restoring execution state from the NVM, the state stored in volatile memory 11 that was lost when the voltage dropped below $V_{min}$ is restored and processing of the main thread can continue. Therefore, at stage 22 the CPU 10 performs processing operations normally. By performing such a checkpointing process, progress made by the CPU 10 is not lost when voltage drops below $V_{min}$ and therefore forward computational progress can be maintained. The time between the voltage warning being signalled to the CPU 10 and the power-loss event is defined as time $T_W$. The time taken to complete the checkpoint process is defined as time $T_C$. $T_W$ is highly variable as it depends on the rate of voltage decay, which in turn depends on the energy harvesting environment. For example, when the energy harvester is a radio frequency (RF) energy harvester, the voltage decay is unpredictable especially when interference and fading are high. $T_C$ is highly variable as it depends on the workload being performed by the CPU 10, including the software program and the software program position, as these define how much execution state is to be saved to NVM 12 in a checkpoint process. The checkpoint will fail if $T_C > T_W$, however due to the variability of $T_C$ and $T_W$, it is not possible to reasonably assume $T_C < T_W$ without large margins (e.g. a very high voltage warning threshold). Large margins mean that, in the cases where $T_C$ is not very large (for workloads having less execution state, for example) checkpointing may start and finish while the power level remains relatively high. Therefore the processor may be asleep for a relatively long time following completion of the checkpoint and before the power-loss event, when the processor could otherwise be performing useful processing operations. This leads to an under-utilisation of the available processing time.

Figure 3:
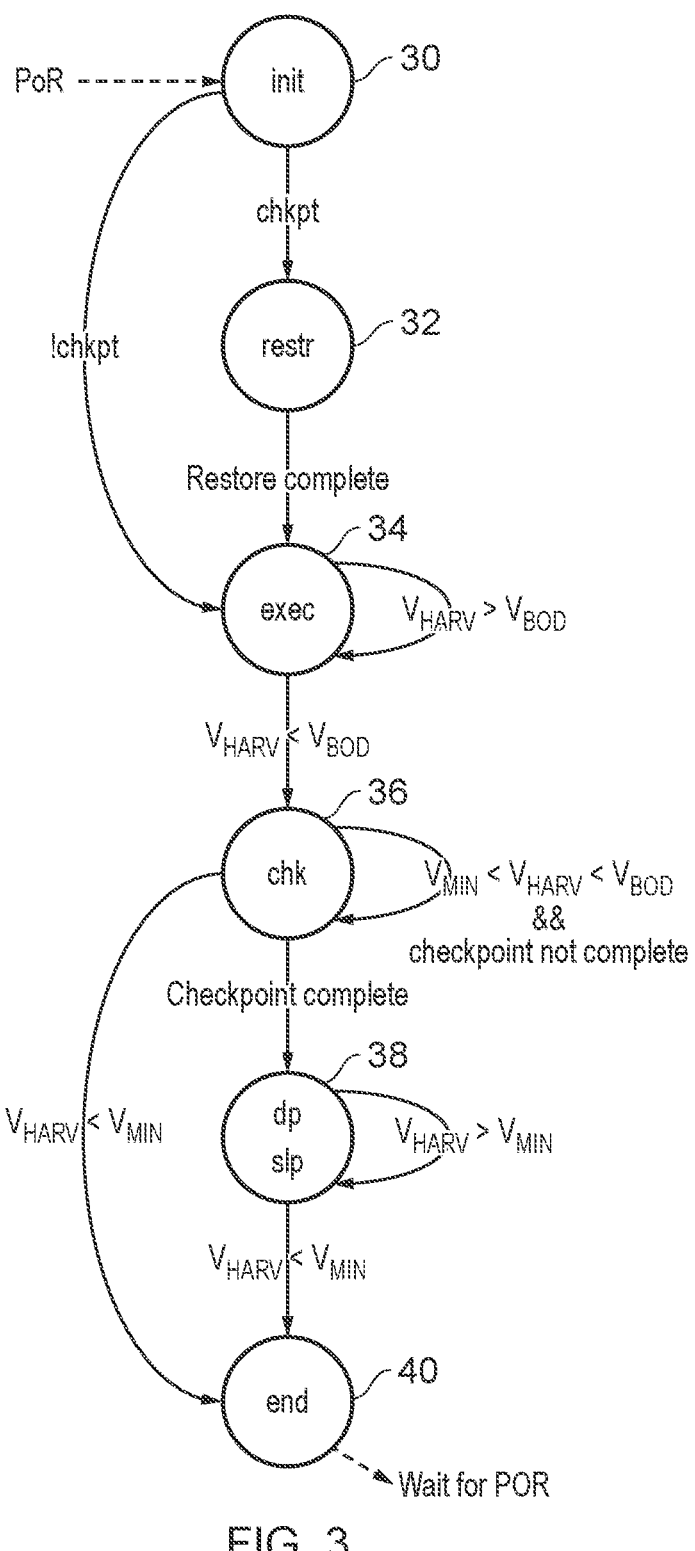
FIG. 3 is a state diagram illustrating state transitions of the intermittent computing system depending on monitoring of voltage.

FIG. 3 is a state diagram illustrating a control model for the intermittent compute system 2. The diagram illustrates various states of the intermittent compute system 2 and the conditions that cause corresponding state transitions to be performed. In FIG. 3, the voltage $V_{HARV}$ corresponds to $V_{dd}$ in FIG. 1. The thresholds $V_{BOD}$, $V_{OK}$, $V_{MIN}$ shown in FIG. 3 correspond respectively to the voltage warning threshold, voltage ok threshold and $V_{min}$ thresholds shown in FIG. 2.

When a power on reset event occurs, the system starts in an initial state 30. If a valid checkpoint of previous context information is available, then the system transitions to a restore state 32 during which the checkpoint is restored by copying the checkpoint data from the non-volatile memory 12 to the volatile memory 11 and registers of the CPU 10. The restoration of checkpoint data can be performed either in software (using a checkpoint restoration routine executed on the CPU 10) or with hardware assistance (for example, the CPU 10 may configure a direct-memory-access (DMA) engine to carry out the transfers to write the checkpoint data read from non-volatile memory 12 to the volatile memory 11). Once checkpoint restoration is complete, the system transitions to the execute state 34 in which execution of the thread of processing corresponding to the restored context information can resume. If no valid checkpoint was available in non-volatile memory 12, then the transition occurs from the initial state 30 to the execute state 34, bypassing the restore state 32, and in this case a thread of processing starts from its beginning without resuming based on restored context.

While the supply voltage $V_{HARV}$ provided based on energy harvested by the energy harvester 4 (including not only the energy directly harvested by the harvester at a given time, but also previously harvested energy stored as charge in a capacitor, or in a battery or another energy storage device) remains above a brownout detection threshold voltage $V_{BOD}$, the system remains in the execute state 34 and execution of the thread of processing continues. The brownout detection threshold voltage $V_{BOD}$ is set at a level above the minimum voltage $V_{MIN}$ at which processing can be sustained in the execute state 34, with the margin between $V_{BOD}$ and $V_{MIN}$ being set so that there is predicted to be sufficient time, between the voltage dropping below $V_{BOD}$ and the voltage reaching $V_{MIN}$ (the time $T_W$), for a checkpoint of execution state to be saved to non-volatile memory 12 (i.e. the margin is set so that $T_C < T_W$). Hence, the voltage dropping below $V_{BOD}$ can be seen as a power-loss warning event serving as a prediction that a power-loss event may occur in the near future. Other implementations may use a different method of detecting the power-loss warning event, such as detecting parameters which indicate current ambient conditions relevant to harvesting of energy by the energy harvester (e.g. signal strength of ambient radio frequency radiation, luminous intensity of solar radiation, etc.), or detecting an indication that another system competing for power delivery will draw a large amount of power risking insufficient power for the intermittent compute system 2. Hence, a prediction of possible future power loss can be based on factors other than voltage.

When a power-loss warning event occurs (in this example, detected based on the supply voltage $V_{HARV}$ dropping below $V_{BOD}$), the system transitions to a checkpointing state 36 in which a checkpoint is taken, to store a snapshot of context information representing the state of the data processing to the non-volatile memory 12. Similar to the checkpoint restoration, the checkpoint saving operations can be performed either in software or with hardware assistance from a DMA engine or similar hardware component which can perform the memory operations to transfer data from volatile to non-volatile memory. While the supply voltage $V_{HARV}$ remains between $V_{BOD}$ and $V_{MIN}$ and the checkpointing is not yet complete, the system remains in the checkpointing state 36.

When the checkpointing process is complete, the system transitions from the checkpointing state 36 to a sleep state (deep sleep, or dp slp) 38, in which the CPU 10 is inactive and can be placed in a power saving state (e.g. by power gating) to save energy.

If, while in either the checkpointing state 36 or the sleep state 38, the supply voltage $V_{HARV}$ drops below $V_{MIN}$ (i.e. a power loss event occurs), then the system transitions to a power loss (end) state 40 and it is assumed that any information in the volatile memory 11 (as well as any storage within the CPU 10 such as registers and caches) is unreliable. The system would then wait until a power on reset event occurs to restart the system in the initial state 30. If the power loss event occurs while the system is in the checkpointing state 36 then the checkpoint which was in progress of being saved may be corrupted and so cannot be relied upon when subsequently restoring from the initial state 30. To allow valid and corrupted checkpoints to be distinguished, one approach can be that at the completion of the checkpoint process, a checkpoint complete marker is saved to the non-volatile memory and so checkpoints which are not associated with the checkpoint complete marker can be considered invalid.

Figure 4:
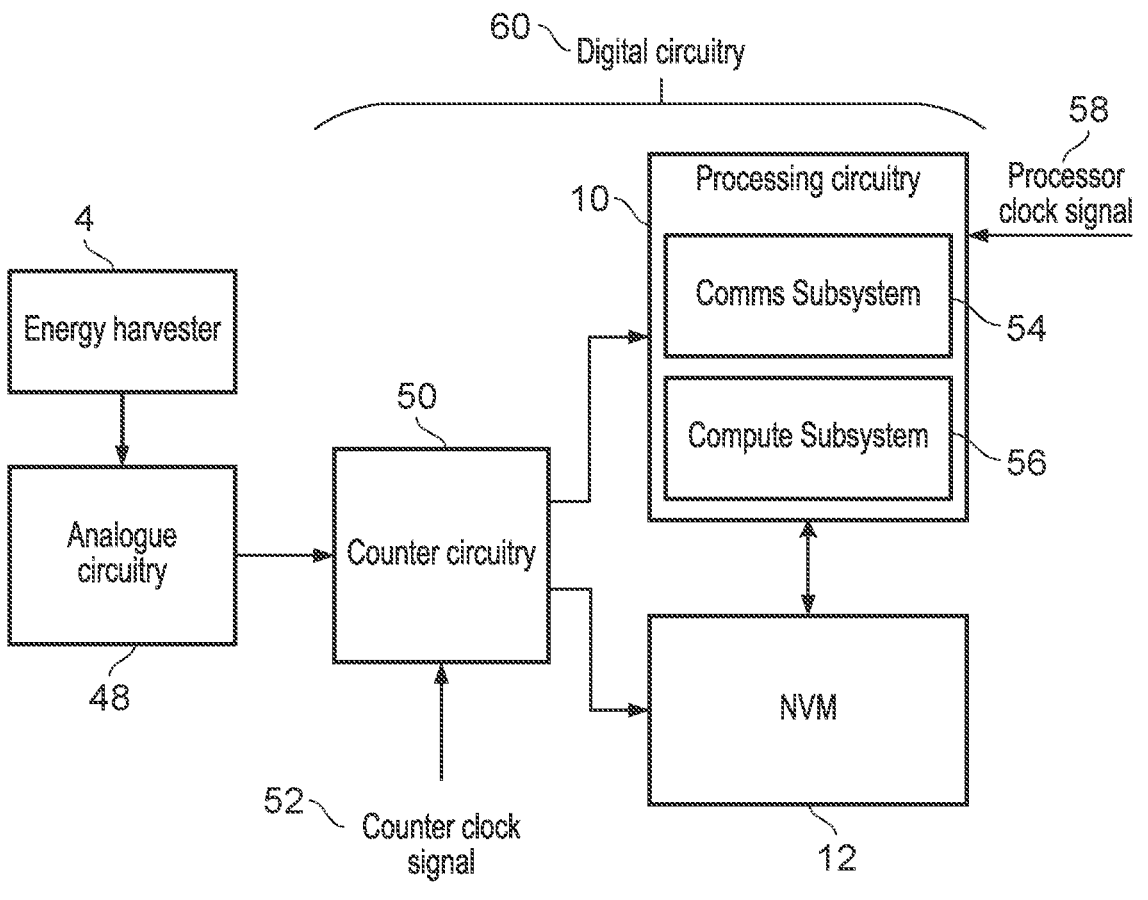
FIG. 4 illustrates an example intermittent computing system comprising counter circuitry.

FIG. 4 illustrates an example intermittent computing system comprising counter circuitry. As shown in FIG. 1, the intermittent computing system comprises an energy harvester 4, processing circuitry 10, and NVM 12. FIG. 4 comprises analogue circuitry 48 for detecting the voltage level of the signal output by the energy harvester and comparing the voltage against a voltage threshold (such as the first power level threshold). The analogue circuitry 48 may comprise, for example, the voltage monitor 6 and POR circuitry 8 shown in FIG. 1. The processing circuitry 10 comprises a communication subsystem 54 and a compute subsystem 56, and is clocked by a processor clock signal 58. The intermittent computing system shown in FIG. 4 also comprises counter circuitry 50 clocked by a counter clock signal 52. The processing circuitry 10, counter circuitry 50 and NVM 12 are all digital circuitry 60. In response to the analogue circuitry 48 signalling a first power level threshold event to the counter circuitry 50, the counter circuitry 50 starts a timer counter at a start value. The timer counter is advanced (either decremented or incremented) in response to the counter clock signal 52 (either in response to every counter clock signal 52 or every N signals). When the timer counter reaches a target value (for example, it has counted down to 0 or X or has counted up to Y) then the counter circuitry 50 signals the first power level threshold event to the processing circuitry 10 and NVM 12. For example, the signal may be a voltage warning interrupt if the first power threshold event is a low-power threshold event, or a voltage OK interrupt if the first power threshold event is a sufficient-power threshold event. By signalling the first power level threshold event to the processing circuitry 10 when the timer counter reaches the target value, the counter circuitry 50 introduces a delay $T_H$ between the first power level threshold event and the signalling of the first power level threshold event, which may allow for an improved utilisation of processing time, as discussed below.

Figure 5:
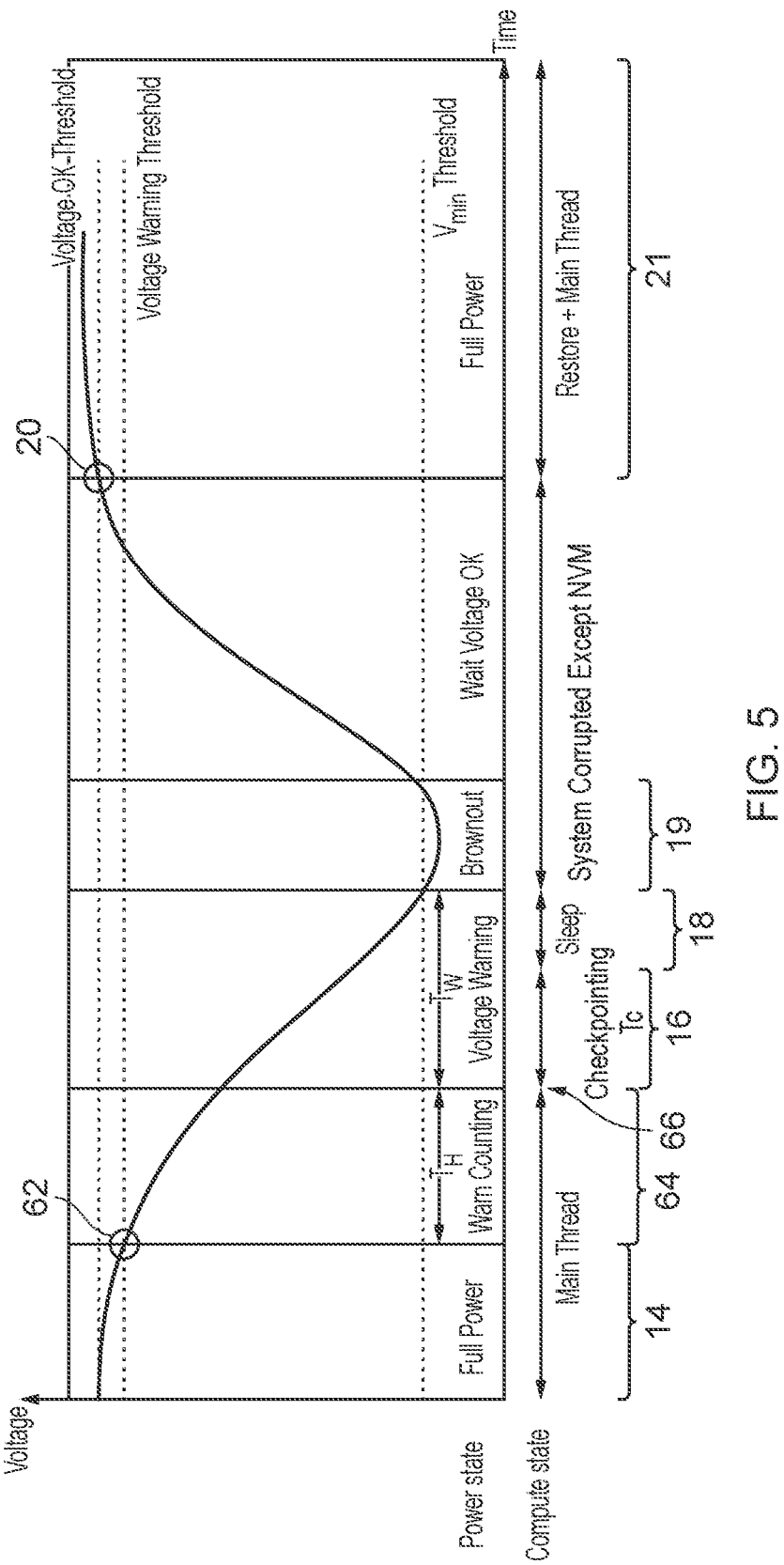
FIG. 5 illustrates an example power cycle sequence for an intermittent computing system employing a timer counter.

FIG. 5 illustrates an example power cycle sequence for an intermittent computing system employing the timer counter. At stage 14, the voltage of the energy harvester 4 output is above the voltage warning threshold. Therefore, at stage 14 the CPU 10 is performing processing operations normally and the processor 10 is therefore in the main thread compute state. At stage 62 the voltage has fallen to the voltage warning threshold value. Unlike the sequence shown in FIG. 2, at this stage the low-power threshold event is not signalled to the processing circuitry. Instead, at stage 62 the analogue circuitry 48 signals a low-power threshold event to the counter circuitry 50. The counter circuitry 50 starts the timer counter. During stage 64, for a time $T_H$ the timer counter is advanced by the counter circuitry 50 in response to a counter clock signal, while the processing circuitry 10 continues to execute the main thread of processing. At stage 66, the timer counter reaches the target value and the low-power threshold event is signalled to the processing circuitry 10 which begins the checkpoint process. The remainder of FIG. 5 follows the same sequence as FIG. 2.

Hence, by providing the timer counter, the sequence of FIG. 5 enables main thread processing to continue for an additional time $T_H$ after the voltage warning threshold has been reached compared to the sequence of FIG. 2. If the voltage threshold is set high to allow the worst-case checkpointing to complete (i.e. $T_C < T_H$ is highly likely even for worst-case $T_C$), then in the example of FIG. 2, sleep time is expected to be long for workloads having a shorter $T_C$, and therefore processing time is not utilised. However, by providing the tuneable delay $T_H$, this means that the processing circuitry 10 can be placed in the sleep state (in which no useful processing is performed) for less time before the power-loss event (brownout), and therefore more processing is performed overall.

The time $T_C$ is highly variable depending on workload. Therefore, the time $T_H$ can be adjusted based on workload (for example, by software). This tuning of the delay $T_H$ allows more processing time to be utilised while still providing sufficient time to checkpoint for all workloads because it means that checkpoints can be started at times according to how long they are predicted to take. Tuning $T_H$ using the timer counter in this way is associated with lower circuit area and power cost than varying the voltage warning threshold due to the complexity of the analogue circuitry required to accurately vary the level at which a voltage threshold comparator triggers the corresponding comparison signal to be asserted based on a comparison of an analogue voltage or other signal from the energy harvester, compared to the digital counter circuitry which can be compared by a digital comparator.

Figure 6:
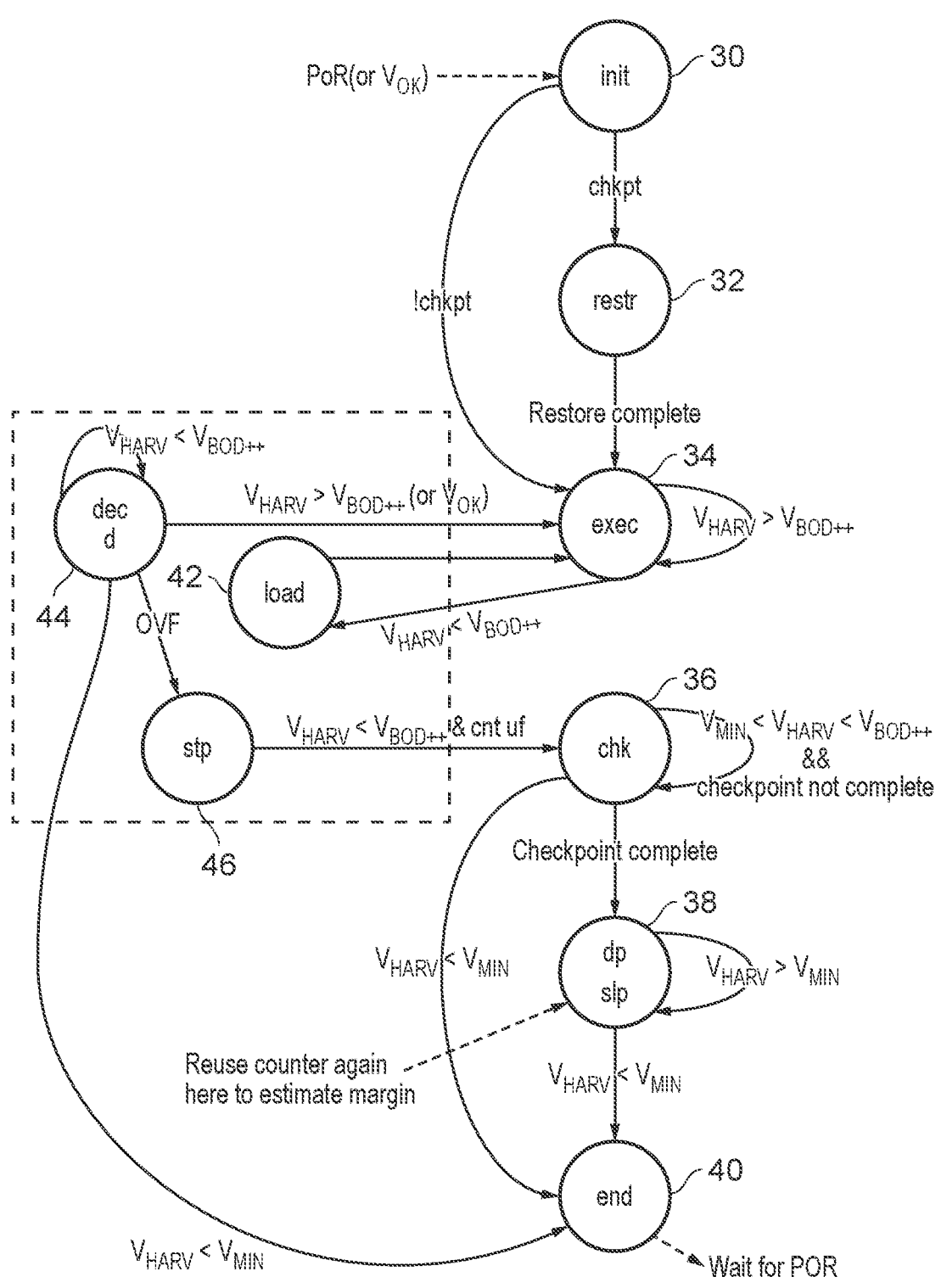
FIG. 6 is a state diagram illustrating state transitions of the intermittent computing system comprising the timer counter, depending on monitoring of voltage.

FIG. 6 is a state diagram illustrating state transitions of the intermittent computing system comprising the timer counter, corresponding to FIG. 5. States 30-40 generally correspond to states 30-40 in FIG. 3. However, $V_{BOD}$ has been replaced with $V_{BOD++}$, which may be set to a different voltage than $V_{BOD}$. For example, $V_{BOD++}$ may be set to a higher voltage than $V_{BOD}$ as the effect of the supply voltage reaching $V_{BOD++}$ can be delayed by counter circuitry 50 so that the timing of signalling the brownout warning is when voltage has dropped further below $V_{BOD++}$. When the system is in execution state 34 and the supply voltage $V_{HARV}$ falls below $V_{BOD++}$, rather than directly transitioning to the checkpoint state 36, the system transitions to a counting state 44 by first transitioning to a counter load state 42 in which the timer counter is set to a start value. Once the timer counter has started, while the supply voltage remains below $V_{BOD++}$ and above $V_{MIN}$, and while the timer counter has not reached the target value, the system is in state 44 whereby the timer counter is advanced. If, while in state 44, the supply voltage increases above $V_{BOD++}$ (or a different second threshold such as $V_{OK}$), the system transitions back to the execution state and the timer is stopped (either reversed or reset). If, while in state 44, the supply voltage falls below $V_{MIN}$, the system transitions to the end state having failed to successfully checkpoint. If, while in state 44, the timer counter reaches the target value (e.g. a counter overflow occurs, as indicated by "OVF" in FIG. 6), the system transitions to state 46 in which the first power level threshold event is signalled to the processor (e.g. with an interrupt). The system then transitions to state 36 in which the checkpoint process is started as described above.

While the system is in state 38, having completed a checkpoint but before brownout (a power-loss event), the timer counter may be reused to estimate a margin between completing the checkpoint and reaching $V_{MIN}$. For example, the counter may continue being advanced from state 44 or may be reset to a new value, and the advancing value of the counter may be periodically saved to NVM 12 whilst the system is in state 38. When the system finally undergoes brownout (state 40), the final value stored to NVM will be indicative of how long the system spent in state 38.

Figure 7:
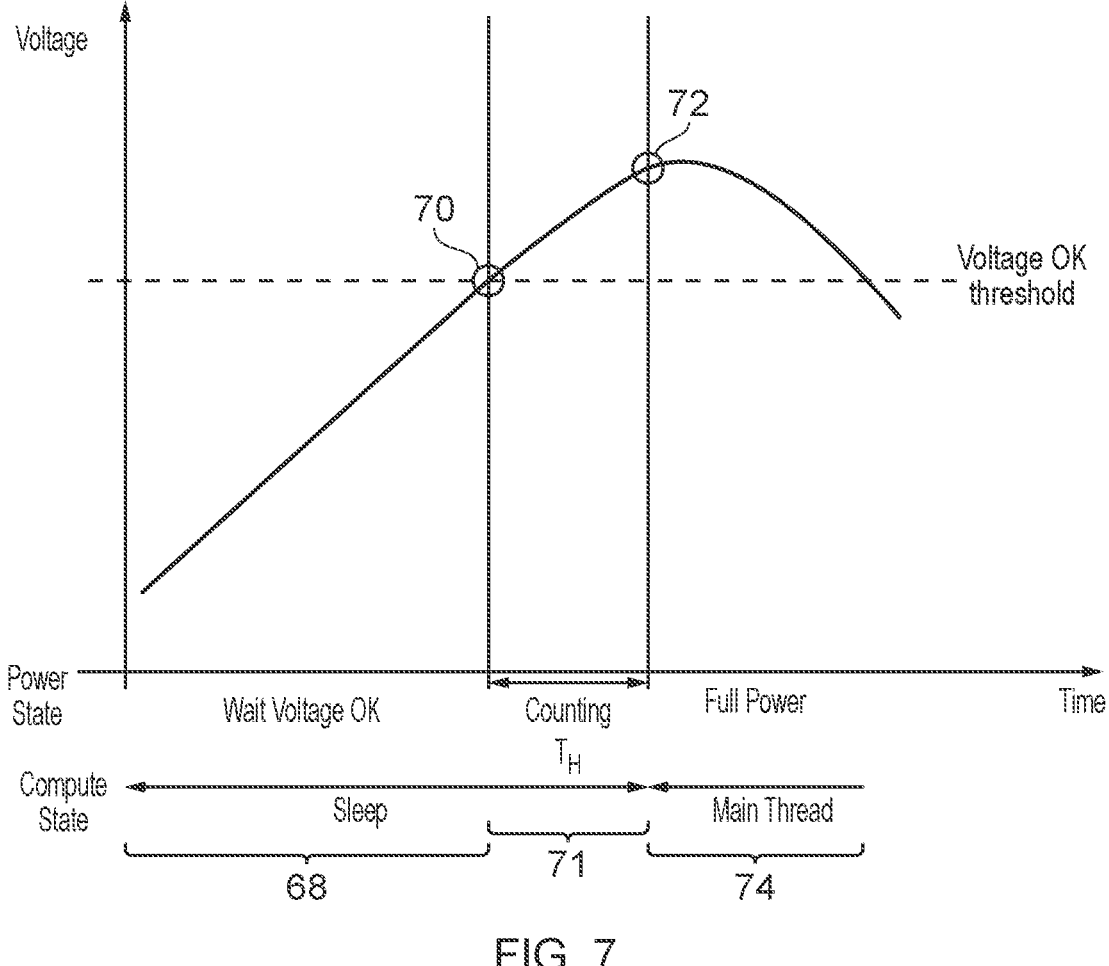
FIG. 7 illustrates an example power cycle sequence for an intermittent computing system employing a timer counter.

FIG. 7 illustrates another example power cycle sequence for an intermittent computing system employing the timer counter. In FIG. 6, the first power threshold value is a sufficient-power threshold (voltage OK threshold) indicating that there is sufficient power for processing to either begin or restart (from checkpointing, a sleep state, or by restoring execution state from NVM 12 after a power-loss event). At stage 68, the voltage is below the voltage OK threshold and therefore no processing is being performed. At stage 70, the voltage reaches the voltage OK threshold, and the analogue circuitry 48 signals a sufficient-power threshold event to the counter circuitry 50, which stars a timer counter. For a time $T_H$ the timer counter advances (stage 71). At stage 72, the timer counter reaches a target value and the sufficient-power threshold event is signalled to the processing circuitry 10 which begins processing at stage 74. As shown, when the processing circuitry 10 begins processing the voltage begins to drop because the harvested energy is insufficient to power the processing circuitry. At a certain point, the processing may be suspended (e.g. a checkpoint process may be started) because the voltage falls below a voltage warning threshold. However, because processing was delayed for a time $T_H$, the power level had time to increase so that more processing could be performed prior to the voltage falling below the voltage warning threshold. Hence, delaying signalling the first power threshold event to the processing circuitry has allowed more processing time to be utilised than if processing were started when the power level reached the sufficient-power threshold. The optimum time between the power level reaching the sufficient-power threshold and the time at which processing should start may depend on many conditions, such as the energy harvesting conditions or the power consumption of the processing circuitry when processing restarts. The power consumption may in turn depend on the workload to be performed when processing restarts. Hence, the optimum time may depend on environmental and workload conditions. Tuning the start of processing by varying the sufficient-voltage threshold may be difficult due to the power cost, circuit area and complexity of a fine-grained analogue voltage comparator. A tuneable timer counter (tuneable with digital logic) gives more control over the start of processing while using less power and circuit area than varying the voltage threshold.

It will be appreciated that while FIGS. 5 and 7 illustrate different examples of the first power level threshold, both techniques can be implemented together in the same apparatus. In fact, by using both techniques together the problem illustrated in FIG. 6 can be further reduced, because processing can continue for a further time after the power level drops below the voltage warning threshold due to the timer counter.

Figure 8:
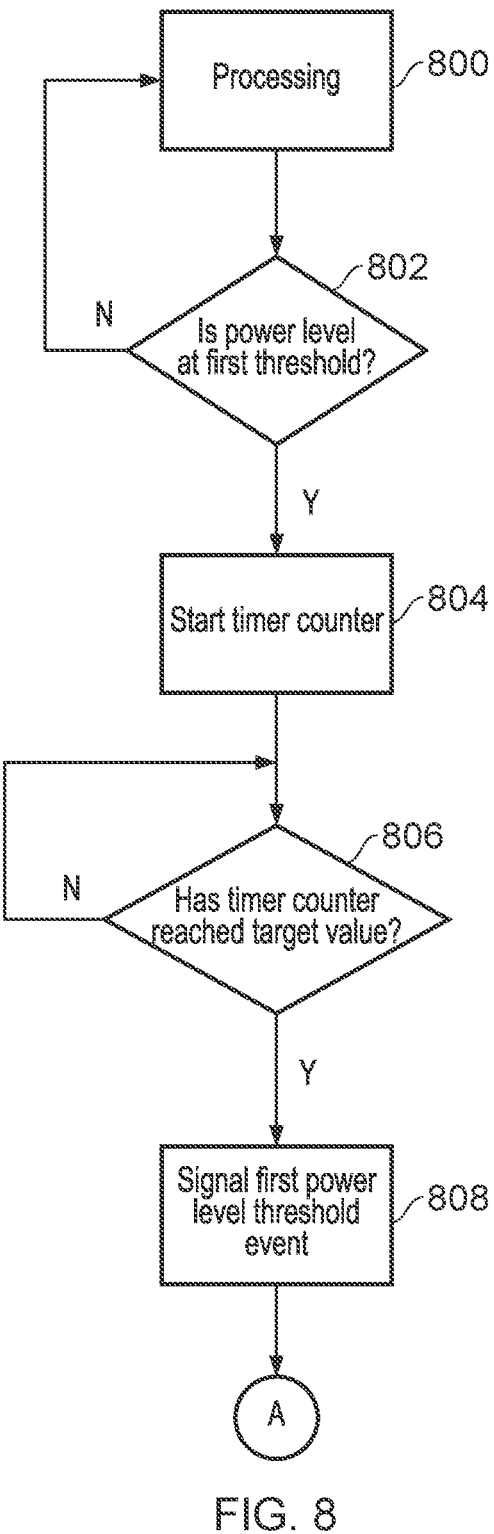
FIG. 8 illustrates a method of operating an intermittent processing apparatus comprising a timer counter.

FIG. 8 illustrates a method of operating an intermittent processing apparatus comprising a timer counter. At stage 800 the processor is in a processing compute state. For example, the processor may be in a main thread state if power is above a low-power threshold or may be in a sleep state if the power is below a sufficient-power threshold. At stage 802, the analogue circuitry 48 determines whether the power level has reached a first threshold value. If not, the processor remains in its current compute state. If the first threshold value has been reached, then the analogue circuitry 48 issues a signal to the counter circuitry 50 to begin the timer counter. The timer counter is started at stage 804 and begins to advance in response to a counter clock signal. At stage 806, the counter circuitry 50 determines whether the timer counter has reached a target value. If not, no signal is generated and the timer continues to advance. However, if the timer counter has reached the target value, then at stage 808 the counter circuitry 50 signals the first power level threshold event to the processing circuitry 10 (and optionally the NVM 12). The signal may be the same signal as issued by the analogue circuitry 48 to the counter circuitry 50, or may be a new signal generated by the counter circuitry 50.

Figure 9:
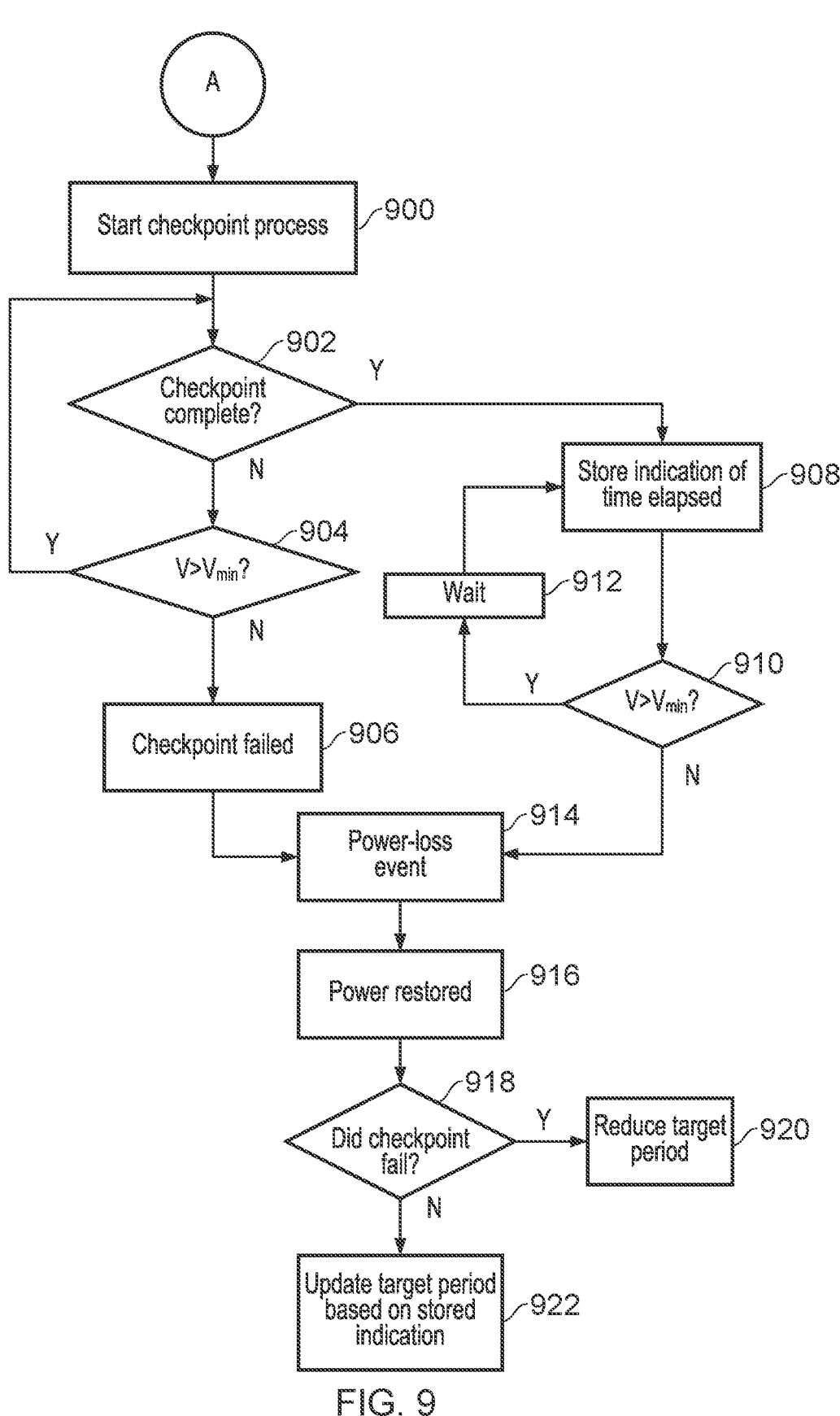
FIG. 9 illustrates a method of adjusting a target period of the timer counter in an intermittent processing apparatus.

FIG. 9 illustrates a method of adjusting a target period of the timer counter in an intermittent processing apparatus. At stage 900 the processor 10 receives a low-power signal from the counter circuitry 50, for example as issued at stage 808 (see FIG. 8). The processor begins a checkpoint process by saving execution state from volatile memory associated with the processing circuitry 10 to NVM 12. At stage 902 the processing circuitry 10 determines whether the checkpoint has completed. If the checkpoint has not completed (there is still state to be saved to the NVM 12) then at stage 904 the processing circuitry determines whether the voltage level of the signal powering the processing circuitry is above the minimum level $V_{min}$, below which correct processing results and/or retention of data in volatile memory cannot be ensured (below which there would be a power-loss event). If the voltage is above $V_{min}$, then the checkpoint process continues and the process returns to stage 902. If the voltage is below $V_{min}$ then there has been a power-loss event. The checkpoint process cannot continue because there is insufficient power to do so and because the data stored in volatile memory to be stored to NVM 12 may have corrupted. Therefore, at stage 906 the checkpoint process has failed. Once power is restored, processing will have to resume from a previous checkpoint that was completed prior to the failed checkpoint and the intervening processing results are lost.

If, at stage 902, the processing circuitry determines that the checkpoint has successfully completed, then it stores to NVM 12 a checkpoint completed indication, puts the processor in a sleep state, and begins to store an indication of the time elapsed since the checkpoint was completed, at stage 908. For example, the value of the timer counter may be written to a location in NVM 12 at periodic intervals, overwriting the previous value (such that the time elapsed can be calculated as the stored value minus the target value). At stage 910, if the voltage is above $V_{min}$, then the processing circuitry continues to store indications of time elapsed to the NVM 12 (for example by waiting for a set time at stage 912 and then returning to stage 908). If the voltage is below $V_{min}$, then there has been a power-loss event, but the indication of the time elapsed between the end of the checkpoint process and the power-loss event (if there has been sufficient time to store such an indication) will be retained in NVM 12. If there is no stored indication, the processing circuitry can assume that the time elapsed between the end of the checkpoint process and the power-loss event is below a minimum value.

After the power-loss event at stage 914, the power will eventually be restored at stage 916 (for example if the energy harvester begins harvesting more energy due to a change in environmental conditions). At this point, it can be determined whether the checkpoint process prior to the power-loss event failed or succeeded at stage 918 (e.g. based on the presence or absence of a "checkpoint completed" indication in NVM 12). If the checkpoint failed, then this suggests that insufficient time was provided to the processing circuitry for completing the checkpoint and that $T_H$ was therefore too large. The target period can therefore be reduced at stage 920 to allow more time for checkpointing in advance of the next power-loss event. If the checkpoint succeeded then the stored indication of time elapsed may be used to adjust the target period at stage 922. For example, if the stored indication indicates that there was more than a particular amount of time after the completion of the checkpoint before power-loss, then this may suggest the checkpoint started too early. Starting the checkpoint too early means that processing time is not utilised while the processor is in the sleep state following the checkpoint. Therefore, the target period $T_H$ may be increased so that the checkpoint starts later. On the other hand, if the stored indication indicates that there was less than a particular amount of time between the end of the checkpoint and power-loss event, this may suggest that the checkpoint process nearly failed (or was at a higher risk of failing) and that more time should be allocated for the checkpoint process in future. Hence, the target period $T_H$ may be reduced so that the checkpoint starts earlier in advance of a future power-loss event. In both cases where the target period is adjusted based on the stored indication of time elapsed since the checkpoint process finished, the target period may be updated by a proportion of the stored indication. Therefore, if there is a large difference between the desired particular amount of time and the indicated time elapsed, the target period can be adjusted by a greater amount and if there is a small difference then the target period can be adjusted by a smaller amount. The particular amount of time set as the target for the period between completion of checkpointing and power loss may be a non-zero value to provide some slack so that the apparatus favours completing a checkpoint and waiting for some time rather than risking failing to complete a checkpoint.

The process described above may be used to adjust a target period associated with a particular workload (and hence the adjustments may not be global, but only applied to the target period for that particular workload).

Figure 10:
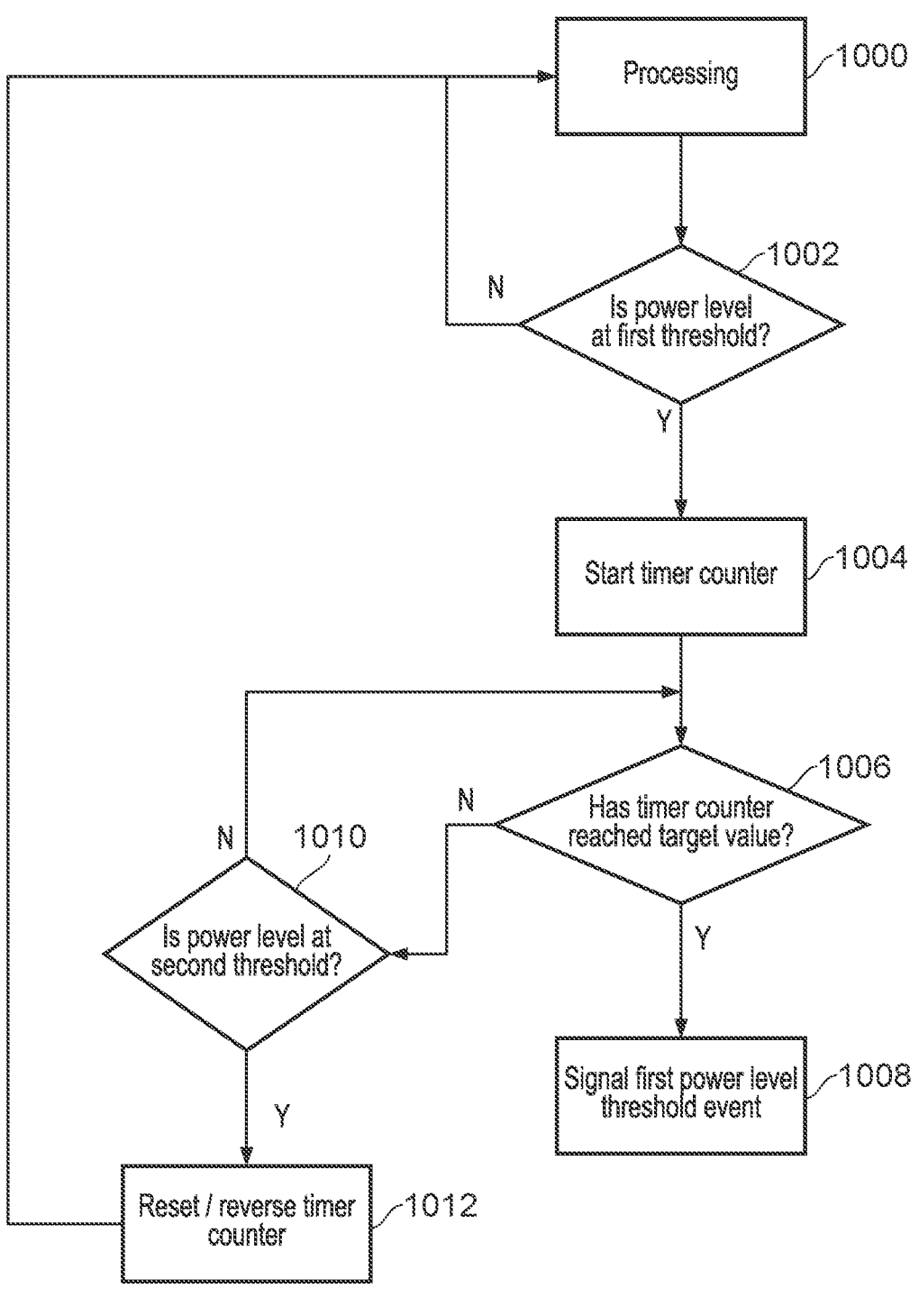
FIG. 10 illustrates a method of controlling an intermittent processing apparatus having a second threshold value.

FIG. 10 illustrates a method of controlling an intermittent processing apparatus having a second threshold. Stages 1000-1004 and 1008 correspond to stages of 800-804 and 808 of FIG. 8. However, at stage 1006, if the timer counter has not reached the target value, the process moves to stage 1010 in which the counter circuitry 50 determines whether the power level has reached a second threshold value (e.g. based on the presence/absence of a signal from analogue circuitry 48). If the second threshold value has not been reached, the process returns to stage 1006. However, if the second threshold value has been reached, then at stage 1012 the timer counter is either reset or has its direction reversed, and the process returns to stage 1000. The next time the process reaches step 1004, the timer counter may be started from the value that the timer counter has reached since being reversed, or the start value if the reversed counter has moved past the start value (e.g. it has counted backwards past the start value).

Figure 11:
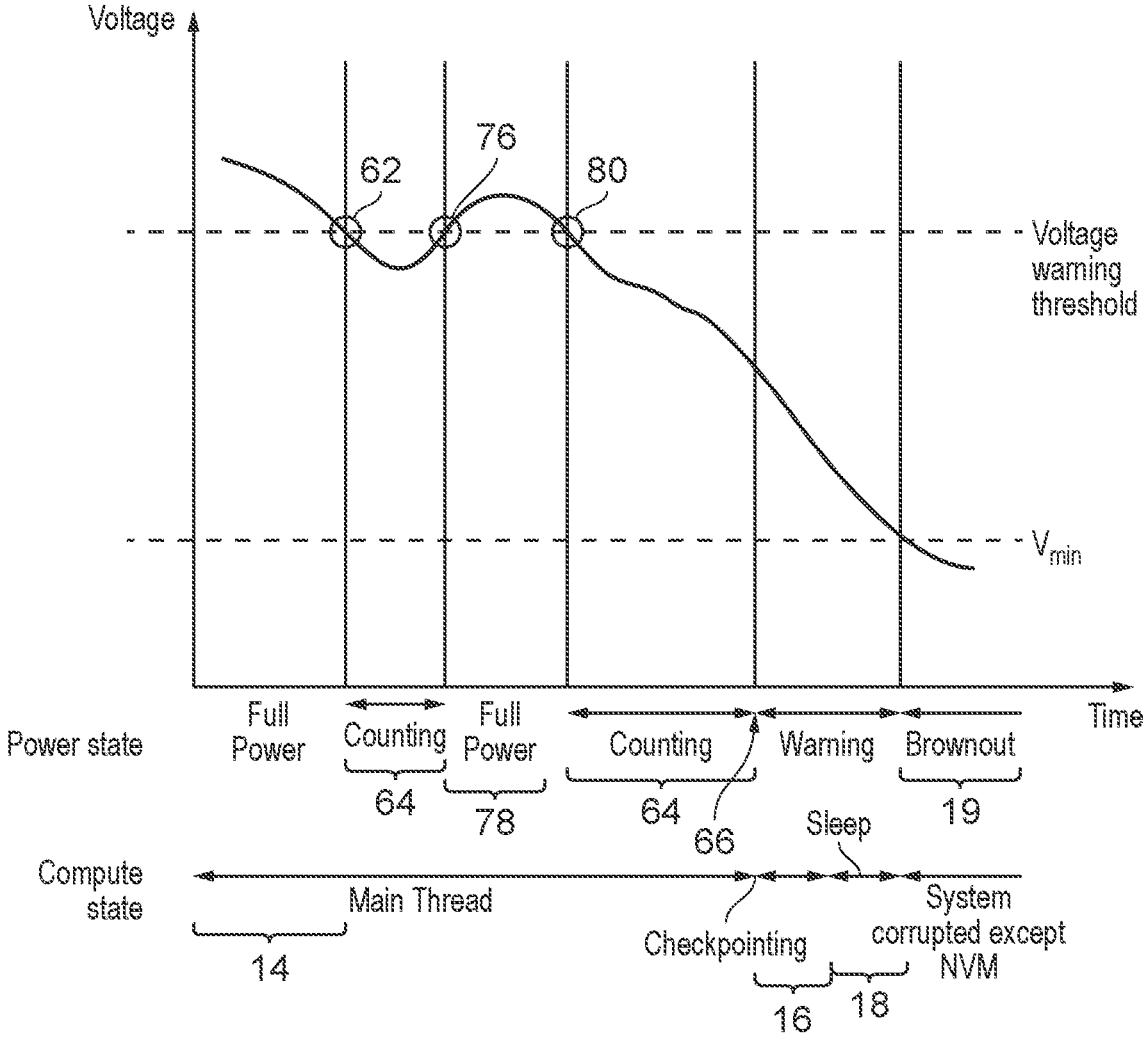
FIG. 11 illustrates an example power cycle sequence for an intermittent computing system having a second threshold value.

FIG. 11 illustrates an example power cycle sequence for an intermittent computing system having a second threshold. In FIG. 11, the second threshold takes the same value as the first threshold, the voltage warning threshold, but other examples could set the second threshold to a higher level than the first threshold, for example. At stage 14, the voltage of the energy harvester output is above the voltage warning threshold. Therefore, at stage 14 the CPU 10 is performing processing operations normally and the processor is therefore in the main thread compute state. At stage 62 the voltage has fallen to the voltage warning threshold value. At stage 62 the analogue circuitry 48 signals a low-power threshold event to the counter circuitry 50, which starts the timer counter. For a time $T<T_H$ the timer counter is advanced by the counter circuitry 50 in response to a counter clock signal, while the processing circuitry continues to execute the main thread of processing during stage 64. At stage 76, the voltage increases above the voltage warning threshold and therefore the power level reaches the second threshold. At this point, the timer counter is either reset or has its direction reversed. In either case, the timer counter ceases counting towards the target value and therefore the checkpoint process will not be started a time $T_H$ after the initial voltage signal at stage 62. This means that small dips below the voltage warning threshold do not cease processing, as would be the case if checkpointing started when the timer reached the target value regardless of the current power level. At stage 78, the voltage is again above the voltage warning threshold and processing proceeds as normal. At stage 80, the voltage once again falls below the voltage warning threshold and the counter begins counting towards the target value (either from the start value, if previously reset or reversed to reach the start value, or from a value between the start value and the target value if the counter was reversed and did not pass the start value). The remainder of the sequence corresponds to FIGS. 2 and 5. It will be seen that the second threshold (and either resetting or reversing the counter) allows dips below the voltage warning threshold to have a reduced impact on processing progress. It will also be seen that by reversing the counter, small spikes above the voltage warning threshold whilst the timer counter is counting towards the target value (during stage 64) will have a smaller impact on the progress of the timer counter compared to resetting the timer counter (although the logic involved to reverse the timer counter may be more complex and therefore have a higher overhead than resetting the timer counter).

It will be appreciated that while FIG. 11 illustrates the second threshold in the context of the first threshold being a voltage warning threshold, similar considerations apply if the first threshold were a sufficient-power threshold, whereby the second threshold prevents processing starting too early if the power briefly spikes above the sufficient-power threshold. Generally, the second threshold allows brief fluctuations in the power level about a power level threshold value to have a reduced impact on processing because a timer counter started during a brief fluctuation can be stopped.

Figure 12:
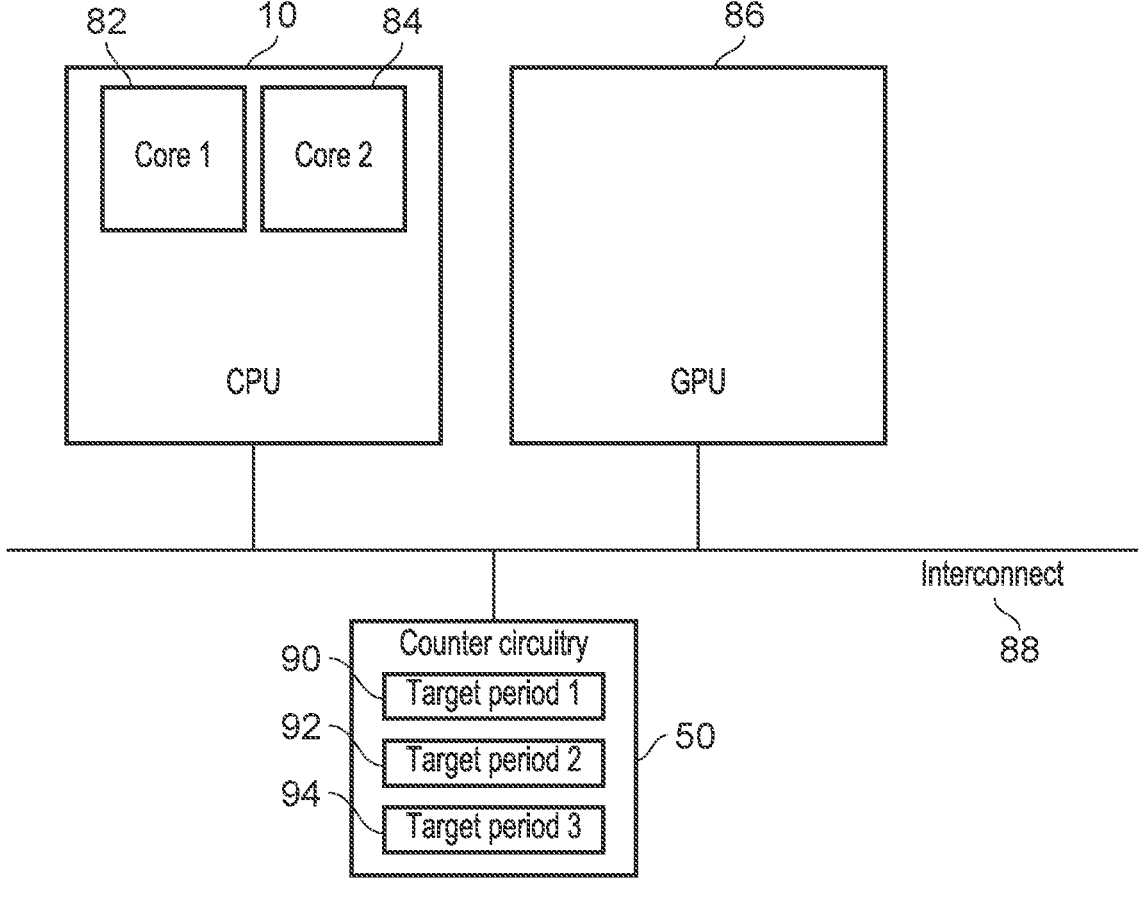
FIG. 12 illustrates an example of a multi-processor intermittent processing system.

FIG. 12 illustrates an example of a multi-processor intermittent processing system. The intermittent processing system comprises a CPU 10 having two cores 82, 84, a GPU 86, and counter circuitry 50. The CPU 10, GPU 86, and counter circuitry 50 can communicate via an interconnect 88. It will be appreciated that, for ease of illustration, several features of the intermittent processing system are not shown but may nevertheless be present (for examples of such features, see FIG. 4). In response to a first voltage threshold event, the counter circuitry 50 starts a shared timer counter. In the low-power example, the processors may be running different workloads and therefore each have different values of $T_C$. It may therefore be desired for the processors to start check-pointing at different times. In the sufficient-power example, as the processors may be running different workloads they may have different power requirements and wish to begin processing at different power levels. Hence, the counter circuitry 50 comprises an indication of three target periods. For example, the counter circuitry 50 may comprise three storage locations 90, 92, 94 each storing a different target value for a timer counter. When the timer counter reaches each target value, the counter circuitry 50 sends an interrupt to the corresponding processor indicating the first voltage threshold event. In this way, the same counter circuitry 50 can be shared between several processors, reducing the circuitry area and power cost per processor of providing a timer counter. The processors may also store an indication of the time elapsed since they finished checkpointing based on the shared timer counter.

Figure 13:
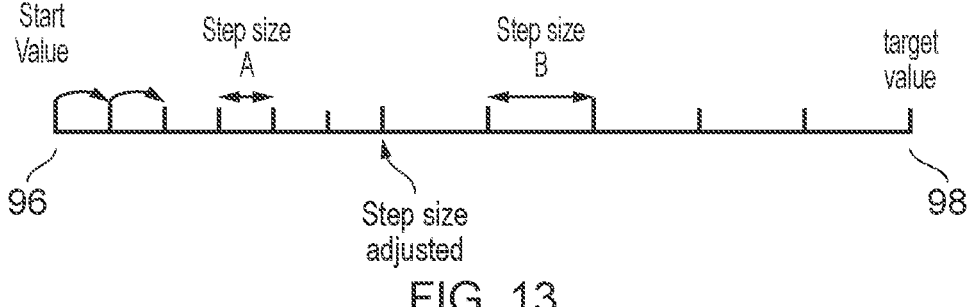
FIG. 13 illustrates an example of a timer counter.

FIG. 13 illustrates an example of a timer counter. The timer counter has a start value 96 and a target value 98 (the target value may be one of several if the timer counter is shared). At each counter clock signal (or every N clock signals), the counter advances by a given step size. For example, the counter value may be incremented or decremented by a value equal to the step size.

Figure 14:
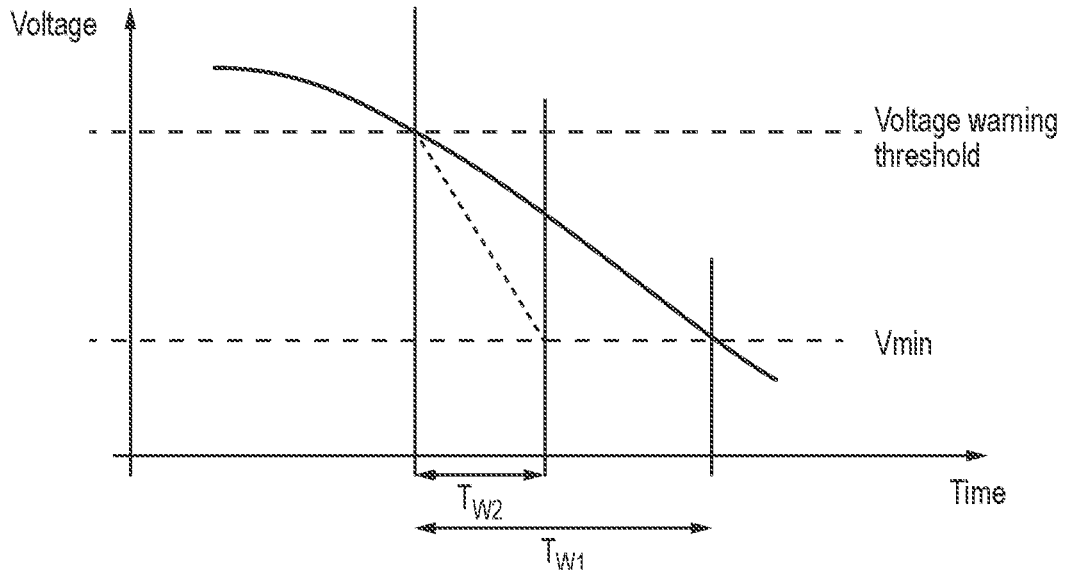
FIG. 14 illustrates an example power cycle sequence for an intermittent processing system.
Figure 15:
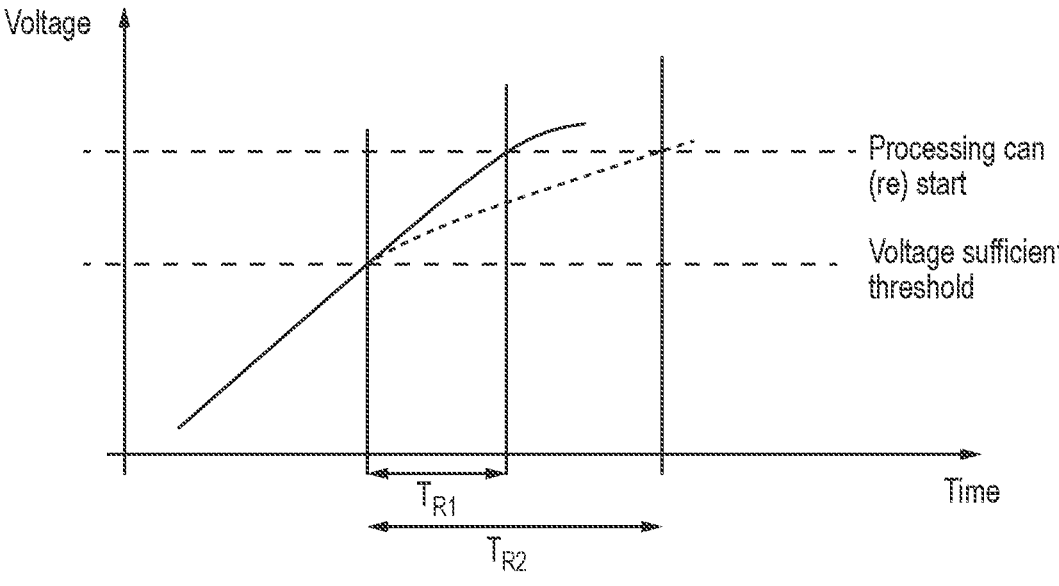
FIG. 15 illustrates an example power cycle sequence for an intermittent processing system.

The time available to perform checkpointing $T_W$ and a time required to build up a sufficient power level to restart the processing circuitry $T_R$ may vary based on the energy harvesting environment as shown in FIGS. 14 and 15. FIGS. 14 and 15 each show two examples of a power level varying over time, in which the solid line indicates a first power level and the dashed line indicates a second power level. The first and second power levels have different rates of change after reaching a first power level threshold. For example, if the energy is harvested from a solar cell then a complete reduction in light intensity may cause a greater decrease in voltage (dashed line in FIG. 14) than a partial reduction in light intensity (solid line in FIG. 14). Hence, the power level may reach a second level ($V_{min}$) after different times $T_{W1}$ or $T_{W2}$. Likewise, a strong increase in light intensity may cause a greater rise in voltage (solid line in FIG. 15) than a weaker increase in light intensity (solid line in FIG. 15) causing the power level to reach a level at which processing may start after different times $T_{R1}$ or $T_{R2}$. It will be appreciated that the energy may be harvested from any source and a solar cell is merely used as an example.

As the times $T_W$ and $T_R$ vary based on environmental conditions, then it can be useful for the timer counter to take these effects into account when counting out the target period $T_H$. As shown in FIG. 13, the step size may be adjusted based on a measured rate of change of power level. For example, if the rate of change of power level is high then the step size may be increased to decrease $T_H$ and if the rate of change of power level is low then the step size may be decreased to increase $T_H$. The step size may be adjusted prior to starting the timer counter (e.g. the rate of change of the power level is measured in advance of starting the timer counter and the step size is adjusted based on the measurement) or, as shown in FIG. 13, may be adjusted continuously even as the timer counter is running. A timer counter may begin having a step size of A and then be adjusted to have a different step size of B during the target period.

A difference in values between the start value and target value may be determined based on a workload so that the timer counter takes into account variations in $T_C$, and the steps taken between the start value and the target value may be determined based on environmental conditions so that the timer counter takes into account variations in $T_W$ or $T_R$. In this manner, the timer counter can introduce delays into the control of an intermittent processing apparatus and enable an increase in utilisation of processing time.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

What is claimed is:

1. A method for an intermittent computing apparatus comprising:

performing processing operations with processing circuitry;

starting a timer counter in response to a first power level threshold event occurring when a power level for powering the processing circuitry reaches a first threshold value; and signalling the first power level threshold event to the processing circuitry in response to the timer counter reaching a target value to trigger the processing circuitry to perform a processing action in response to the first power level threshold event at a timing delayed in time from the occurrence of the first power level threshold event by a delay controlled based on the timer counter, wherein a first variant of the first power level threshold event comprises a low-power threshold event which occurs when the power level falls below a low-power threshold value, performing a checkpoint process comprising storing a checkpoint of context data corresponding to processing performed by the processing circuitry to a non-volatile data store in response to the low-power threshold event being signalled to the processing circuitry; and updating a value indicative of a target period following restoration of power after a power-loss event occurring when the power level falls below a minimum value;

wherein the target period comprises a time taken for the timer counter to advance from a start value to the target value.

2. The method according to claim 1, comprising updating the value indicative of the target period to reduce the target period in response to determining that the checkpoint process failed to complete due to the power-loss event.

3. The method according to claim 1, comprising
following the completion of the checkpoint process and prior to the power-loss event, storing to a non-volatile data store an indication of time elapsed since the completion of the checkpoint process; and
updating the value indicative of the target period in dependence on the stored indication.

4. The method according to claim 3, wherein
the time elapsed since the completion of the checkpoint process is determined using the timer counter.

5. The method according to claim 1, wherein
a second variant of the first power level threshold event comprises a sufficient-power threshold event which occurs when the power level exceeds a sufficient-power threshold value.

6. The method according to claim 5, comprising
starting or resuming processing in response to the sufficient-power threshold event being signalled to the processing circuitry.

7. The method according to claim 1, comprising
setting a value indicative of a target period for the timer counter dependent on the workload being performed by the processing circuitry;
wherein the target period comprises a time taken for the timer counter to advance from a start value to the target value.

8. The method according to claim 7, wherein
the target period is programmable by software running on the processing circuitry.

9. The method according to claim 1, comprising
resetting the timer counter in response to a second power level threshold event occurring when the power level for powering the processing circuitry reaches a second threshold value.

10. The method according to claim 7, comprising
reversing the counting direction of the timer counter in response to a second power level threshold event occurring when the power level for powering the processing circuitry reaches a second threshold value.

11. The method according to claim 1, wherein
the processing circuitry comprises a plurality of processors;
the timer counter is shared between the plurality of processors; and
the target value is specified independently for each processor.

12. The method according to claim 1, comprising
updating the timer counter in steps of a given size, and adjusting the given size based on a parameter indicative of a rate of change of the power level.

13. The method according to claim 1, wherein
the timer counter is updated based on a counter clock signal, and
the counter clock signal is different from a processor clock signal used to clock the processing circuitry.

14. The method according to claim 1, wherein the detection of whether the power level reaches the first threshold value is performed using analogue comparison circuitry; and
a delay between the occurrence of the first power level threshold event and the signalling of the first power level threshold event to the processing circuitry is tuneable using digital circuitry setting a target period comprising a difference between a start value of the timer counter and the target value.

15. The method according to claim 1, wherein the intermittent computing apparatus is powered using harvested energy.

16. An intermittent computing apparatus comprising:

processing circuitry; and counter circuitry configured to start a timer counter in response to a first power level threshold event occurring when a power level for powering the processing circuitry reaches a first threshold value, wherein the counter circuitry is configured to signal the first power level threshold event to the processing circuitry in response to the timer counter reaching a target value to trigger the processing circuitry to perform a processing action in response to the first power level threshold event at a timing delayed in time from the occurrence of the first power level threshold event by a delay controlled based on the timer counter;

wherein a first variant of the first power level threshold event comprises a low-power threshold event which occurs when the power level falls below a low-power threshold value, wherein the processing circuitry is configured to perform a checkpoint process comprising storing a checkpoint of context data corresponding to processing performed by the processing circuitry to a non-volatile data store in response to the low-power threshold event being signalled to the processing circuitry, and wherein the counter circuitry is configured to update a value indicative of a target period following restoration of power after a power-loss event occurring when the power level falls below a minimum value, wherein the target period comprises a time taken for the timer counter to advance from a start value to the target value.

17. The intermittent computing apparatus according to claim 16, comprising analogue comparison circuitry configured to detect whether the power level has reached the first threshold value, and digital circuitry configured to set a target period comprising a time taken for the timer counter to advance from a start value to the target value.

* * * * *